(12) United States Patent
Elliott

(10) Patent No.: US 9,316,015 B1
(45) Date of Patent: Apr. 19, 2016

(54) SHELTER FOR PROTECTION AGAINST WIND AND BLAST EVENTS

(71) Applicant: Specialty Hardware L.P., Newport Beach, CA (US)

(72) Inventor: A. Carleton Elliott, Newport Beach, CA (US)

(73) Assignee: Specialty Hardware L.P., Newport Beach, CA (US)

( * ) Notice: Subject to any disclaimer, the term of this patent is extended or adjusted under 35 U.S.C. 154(b) by 0 days.

(21) Appl. No.: 14/615,417

(22) Filed: Feb. 5, 2015

Related U.S. Application Data

(60) Provisional application No. 61/943,032, filed on Feb. 21, 2014.

(51) Int. Cl.
| | |
|---|---|
| *E04H 9/14* | (2006.01) |
| *E04B 1/24* | (2006.01) |
| *E04B 1/98* | (2006.01) |
| *E04B 2/56* | (2006.01) |
| *E04B 2/58* | (2006.01) |
| *E04C 3/32* | (2006.01) |
| *E04C 3/04* | (2006.01) |
| *E06B 5/10* | (2006.01) |

(52) U.S. Cl.
CPC .. *E04H 9/14* (2013.01); *E04B 1/24* (2013.01); *E04B 1/98* (2013.01); *E04B 2/562* (2013.01); *E04B 2/58* (2013.01); *E04C 3/04* (2013.01); *E04C 3/32* (2013.01); *E06B 5/10* (2013.01); *E04B 2001/2415* (2013.01); *E04B 2001/2481* (2013.01); *E04B 2001/2484* (2013.01); *E04B 2103/06* (2013.01)

(58) Field of Classification Search
CPC ..... E04H 9/14; E04H 9/16; E04C 2003/0443; E04C 2003/0473; E04B 2/562; E04B 2/60; E04B 2/62; E04B 1/94; E04B 1/98; E04B 1/24; E04B 2001/2481; E04B 2001/2484
See application file for complete search history.

(56) References Cited

U.S. PATENT DOCUMENTS

| | | | |
|---|---|---|---|
| 3,457,698 A * | 7/1969 | Albers | 52/223.7 |
| 5,768,841 A | 6/1998 | Swartz et al. | |
| 6,415,557 B1 * | 7/2002 | McCalley | 52/79.1 |
| 7,637,073 B2 | 12/2009 | Elliott et al. | |
| 7,658,045 B2 | 2/2010 | Elliott et al. | |
| 7,770,346 B2 | 8/2010 | Elliott | |
| 7,823,364 B2 | 11/2010 | Elliott | |
| 8,056,301 B2 | 11/2011 | Elliott, Jr. et al. | |
| 8,079,188 B2 | 12/2011 | Elliott et al. | |

(Continued)

*Primary Examiner* — Adriana Figueroa
*Assistant Examiner* — Jessie Fonseca
(74) *Attorney, Agent, or Firm* — Patterson IP Law, P.C.; Jerry Turner Sewell

(57) ABSTRACT

A shelter for protecting occupants from the effects of high velocity winds and explosive blasts includes a steel framework mountable on a foundation. The steel framework includes a floor structure and a roof structure spaced apart by vertical columns. Each of the floor structure and the wall structure includes panels mounted on joists wherein each panel includes a sheet of non-combustible material laminated to a metallic sheet. Each panel is mounted to the joists with the metallic sheet adjacent to the joists. The shelter further includes walls that include vertical studs secured to the floor structure and the roof structure. Outer wall panels are secured to outer surfaces of the studs. Each outer wall panel includes a sheet of non-combustible material laminated to a metallic sheet. Each outer wall panel is mounted with the metallic sheet adjacent to the vertical stud.

22 Claims, 26 Drawing Sheets

(56) References Cited

U.S. PATENT DOCUMENTS

| | | |
|---|---|---|
| 8,161,710 B2 | 4/2012 | Elliott et al. |
| 8,756,896 B1 | 6/2014 | Elliott |
| 8,776,453 B1* | 7/2014 | Fain ............................ 52/169.6 |
| 2003/0066249 A1* | 4/2003 | Walsh ............................ 52/79.1 |
| 2004/0163356 A1* | 8/2004 | Rice ............................ 52/720.1 |
| 2004/0200172 A1* | 10/2004 | Beck et al. ................. 52/506.03 |
| 2005/0126104 A1* | 6/2005 | Erickson et al. ................ 52/633 |
| 2007/0044407 A1* | 3/2007 | Elliott .......................... 52/483.1 |
| 2008/0245025 A1* | 10/2008 | Slater et al. ...................... 52/696 |
| 2009/0158679 A1* | 6/2009 | Swartz et al. .................... 52/272 |
| 2009/0289065 A1* | 11/2009 | Sampson ...................... 220/324 |
| 2010/0018131 A1* | 1/2010 | Green ...................... E04B 1/24 52/79.5 |
| 2010/0199892 A1* | 8/2010 | Elliott et al. ..................... 109/83 |
| 2011/0225915 A1* | 9/2011 | Swartz et al. .................. 52/309.4 |
| 2012/0222367 A1* | 9/2012 | Wirtz ............................ 52/79.1 |

\* cited by examiner

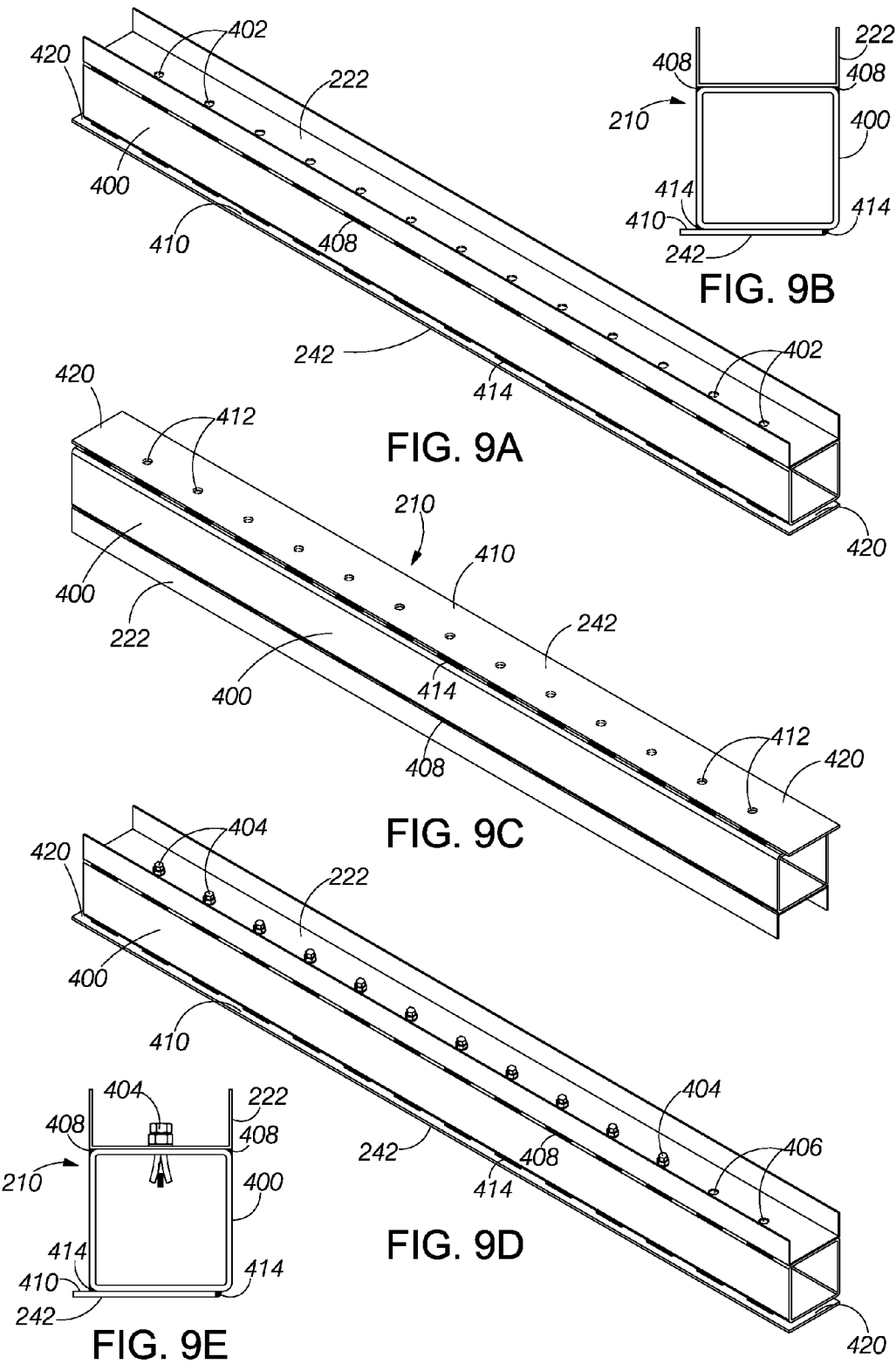

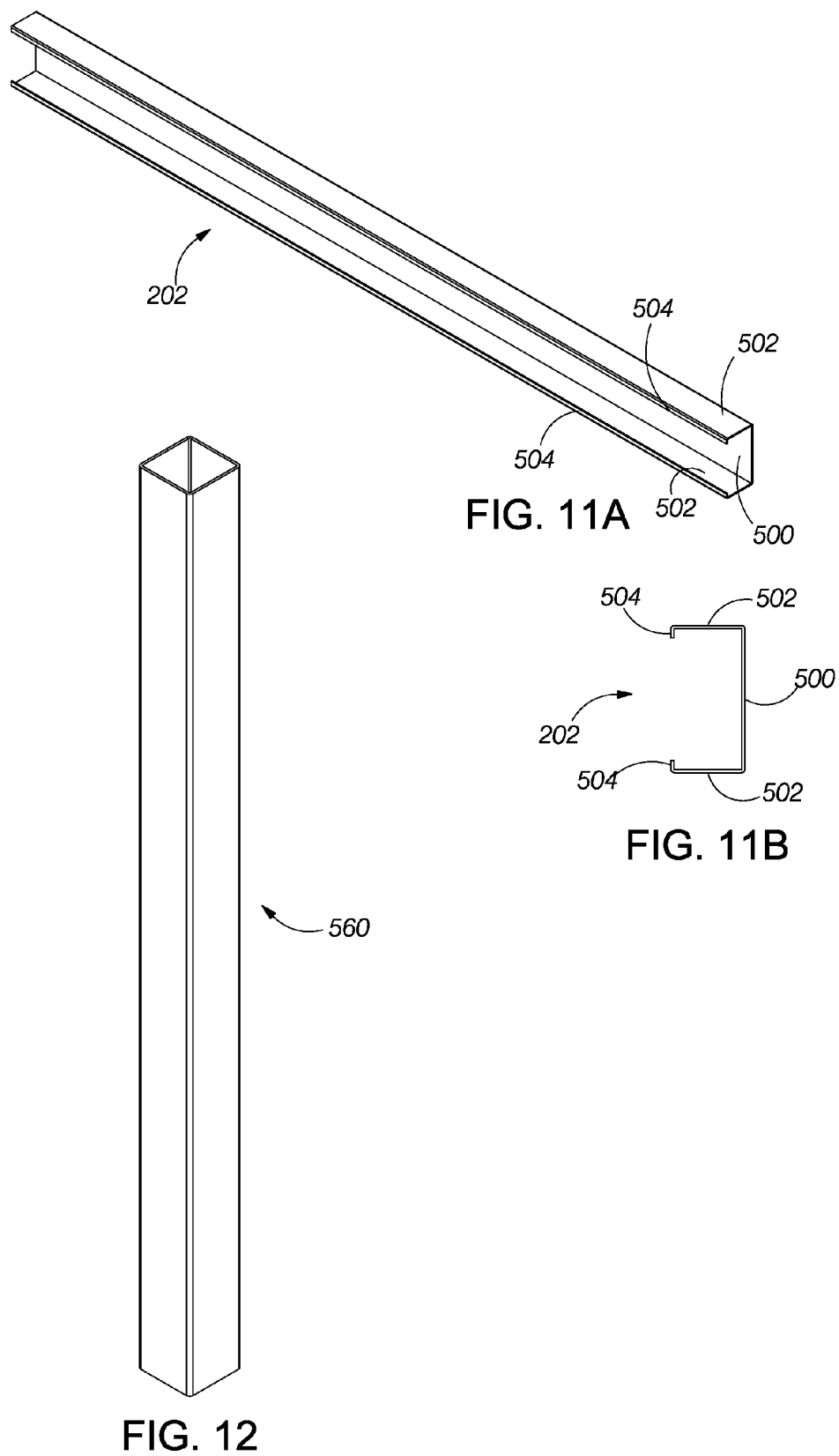

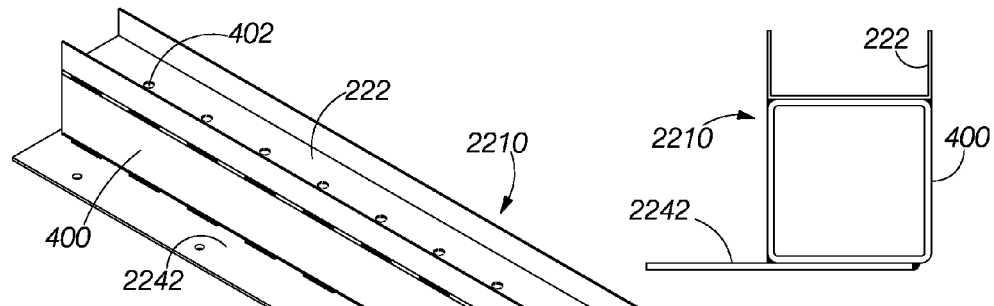
FIG. 37B
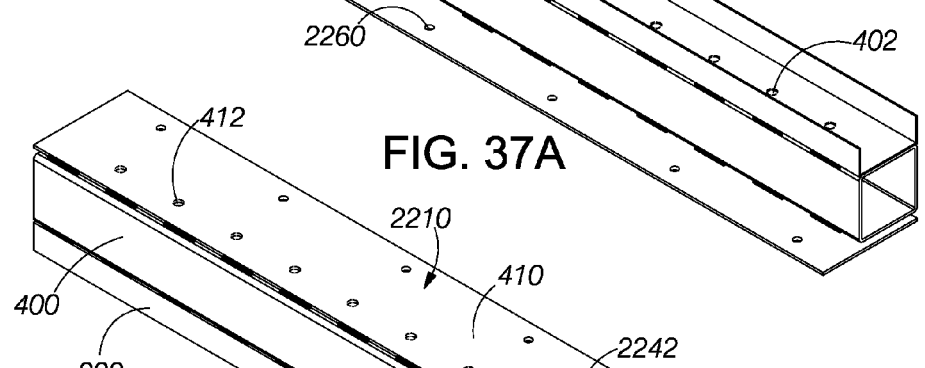
FIG. 37A
FIG. 37C
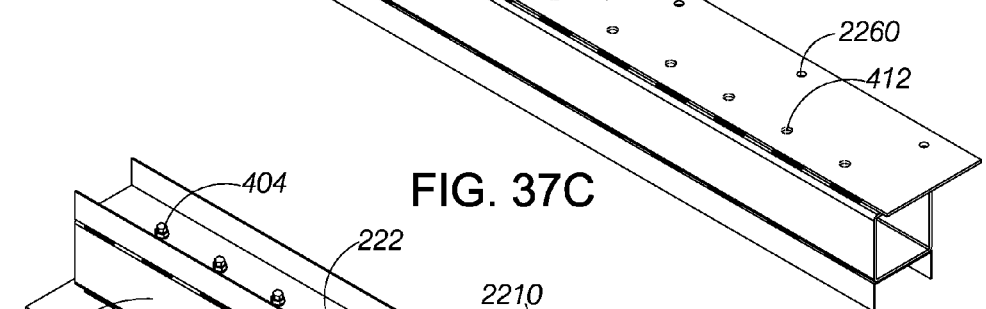
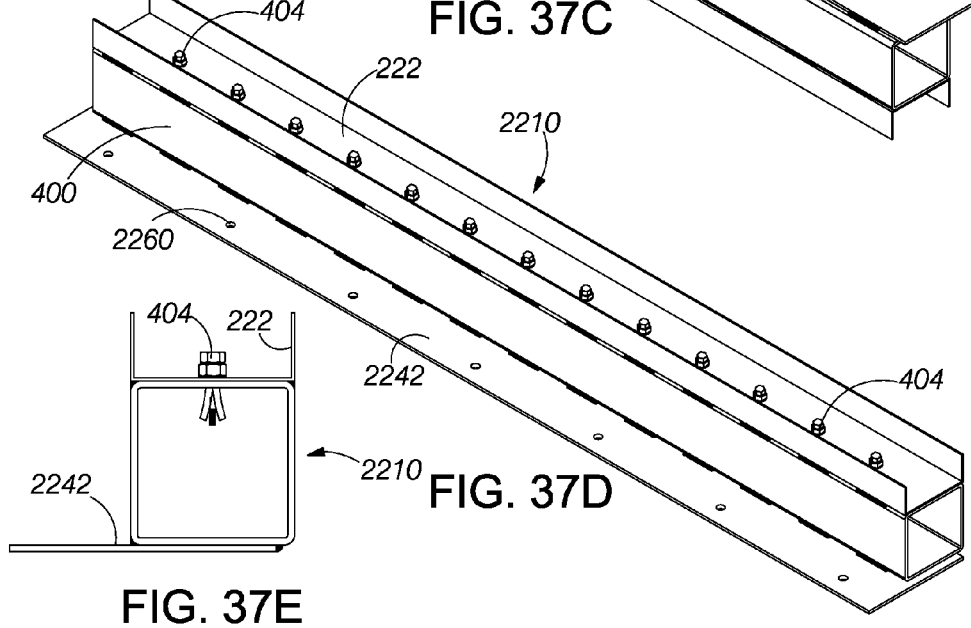
FIG. 37D
FIG. 37E

SHELTER FOR PROTECTION AGAINST WIND AND BLAST EVENTS

RELATED APPLICATIONS

The present application claims the benefit of priority under 35 USC §119(e) to U.S. Provisional Application No. 61/943,032, filed on Feb. 21, 2014, which is incorporated by reference herein.

BACKGROUND OF THE INVENTION

1. Field of the Invention

The description and claims in this application are related to a shelter to protect occupants from the effects of high velocity winds (e.g., tornadoes, hurricanes and straight line winds) and explosive blasts.

2. Description of the Related Art

Underground storm shelters are common in the mid-West, particularly in the so-called "tornado alley" where the effects of high winds destroy structures and also injure and kill people because of the flying debris from the destroyed structures and from uprooted trees, fences, and numerous other objects. Other needs for shelters exist in areas near large refineries, chemical plants and the like, where a fire or other event can result in large explosions that cause high pressures and flying debris.

Although underground storm shelters are effective, some property owners are not able to construct such shelters because of economic considerations or because the property is not compatible with such shelters. For example, the property may have a high water table or may have bedrock close to the surface, both of which inhibit the construction of an underground shelter.

SUMMARY OF THE INVENTION

In view of the foregoing, a need exists for an aboveground shelter that is economical, that is easy to construct and that provides effective protection against the effects of high velocity winds and explosive blasts.

An aspect of an embodiment disclosed herein is a shelter for protecting occupants from debris and other effects of high velocity winds and explosive blasts. The shelter comprises a floor structure, a roof structure and a plurality of vertical columns.

The floor structure comprises a first generally rectangular steel frame structure that comprises a first lower side beam, a second lower side beam, a first lower end beam and a second lower end beam. The first and second lower end beams are positioned orthogonally to the first and second lower side beams and are secured to the lower side beams. The intersections of the lower end beams with the lower side beams form corners of the first steel frame structure. A plurality of floor joists extend between the lower side beams. Each joist has an upper surface and a lower surface. A lower diaphragm comprising a plurality of metallic sheets is secured to the lower surfaces of the floor joists. A floor comprising a plurality of floor panels is secured to the upper surfaces of the floor joists. Each floor panel comprises a non-combustible board laminated to a metallic sheet. Each floor panel is positioned on the floor joists with the respective metallic sheet adjacent to upper surfaces of the floor joists and with the non-combustible board facing upward away from the floor joists. Each of the vertical columns has a lower end and an upper end. At least one column is positioned at each corner of the first steel frame structure with the lower end of the column secured to the first steel frame structure.

The roof structure comprises a second generally rectangular steel frame structure comprising a first upper side beam, a second upper side beam, a first upper end beam and a second upper end beam, the first and second upper end beams positioned orthogonally to the first and second upper side beams, the intersections of the upper end beams with the upper side beams forming corners of the second steel frame structure, the corners of the second steel frame structure positioned onto the upper ends of the columns and secured to the upper ends of the columns. A plurality of roof joists extend between the first and second upper side beams. Each roof joist has an upper surface and a lower surface. A roof comprising a plurality of roof panels is secured to the upper surfaces of the roof joists. Each roof panel comprises a non-combustible board laminated to a metallic sheet. Each roof panel is positioned on the roof joists with the respective metallic sheet adjacent to upper surfaces of the roof joists and with the non-combustible board facing upward away from the roof joists.

A first side wall is formed between the first lower side beam and the first upper side beam. A second side wall is formed between the second lower side beam and the second upper side beam. A first end wall is formed between the first lower end beam and the first upper end beam. A second end wall is formed between the second lower end beam and the second upper end beam. Each of the first and second side walls and the first and second end walls comprises a respective plurality of wall studs extending vertically from the respective lower beam to the respective upper beam. Each wall stud has an inner surface and an outer surface. A respective plurality of outer wall panels are positioned on the outer surfaces of the respective wall studs. Each outer wall panel comprises a non-combustible board laminated to a metallic sheet. Each outer wall panel is positioned on the wall studs with the respective metallic sheet adjacent to outer surfaces of the wall studs and with the non-combustible board facing outward away from the wall studs.

In certain embodiments, each of the first and second side walls and the first and second end walls further comprises a respective plurality of inner wall panels attached to the inner surfaces of the respective plurality of wall studs. Each of the inner wall panels comprises a non-combustible board laminated to a metallic sheet. Each inner wall panel is positioned on the wall studs with the respective metallic sheet adjacent to inner surfaces of the wall studs and with the non-combustible board facing away from the wall studs.

In certain embodiments, a plurality of cavities are formed in each of the first and second side walls and the first and second end walls. Each cavity is defined between a respective lower beam and a respective upper beam, between respective adjacent spaced apart studs and between the metallic sheets of respective outer and inner panels attached to the spaced apart studs. Each cavity is at least partially filled with a material to impede the passage of a ballistic object that penetrates the outer panel. In certain embodiments, each cavity includes a bag-like structure that is positioned in the cavity and filled with the material, such as a granular material. For example, the granular material is advantageously sand.

In certain embodiments, the roof structure further comprises a plurality of ceiling panels secured to the lower surfaces of the roof joists. Each ceiling panel comprises a non-combustible board laminated to a metallic sheet. Each ceiling panel is positioned on the roof joists with the respective metallic sheet adjacent to lower surfaces of the roof joists and with the non-combustible board facing downward away from the roof joists.

In certain embodiments, each lower end beam comprises a hollow structural section steel tube having a lower surface and an upper surface. A lower stud mounting track is secured to the upper surface of the steel tube. Each upper end beam comprises a hollow steel tube having a lower surface and an upper surface. An upper stud mounting track is secured to the lower surface of the steel tube. A roof panel support frame is secured to the upper surface of the steel tube.

In certain embodiments, each lower side beam comprises a hollow structural section steel tube having a lower surface, an upper surface and a side surface. A lower stud mounting track is secured to the upper surface of the steel tube. A floor joist mounting track is secured to the side surface of the steel tube. Each upper side beam comprises a hollow steel tube having a lower surface, an upper surface and a side surface. An upper stud mounting track is secured to the lower surface of the steel tube. A roof joist mounting track is secured to the side surface of the steel tube. A roof panel support frame is secured to the upper surface of the steel tube.

In certain embodiments, the floor structure is secured to a concrete foundation via a plurality of anchor bolts embedded in the foundation.

In certain embodiments, an opening is formed in at least one of the first end wall, the second end wall, the first side wall or the second side wall. A blast-resistant door is secured within the opening.

BRIEF DESCRIPTION OF THE DRAWINGS

The foregoing aspects and other aspects of this disclosure are described in detail below in connection with the accompanying drawing figures in which:

FIGS. 9A, 9B and 9C illustrate a perspective view, an elevational end view and a flipped perspective view, respectively, of one of the end beams of the floor structure of FIGS. 2 and 3;

FIGS. 9D and 9E illustrate a perspective view and an elevational view similar to FIGS. 9A and 9B with a box bolt replacing the puddle welds of FIG. 9A;

FIGS. 11A and 11B illustrate a perspective view and an end elevational view of one of the floor joists of the floor structure of FIGS. 2 and 3;

FIG. 12 illustrates a perspective view of one of four columns to be mounted perpendicularly to the floor structure of FIGS. 2 and 3;

FIGS. 37A, 37B and 37C illustrate a perspective view, an elevational end view and a flipped perspective view, respectively, of one of the end beams of the floor structure of FIGS. 32 and 33;

FIGS. 37D and 37E illustrate a perspective view and an elevational view similar to FIGS. 37A and 37B with a box bolt replacing the puddle welds of FIG. 37A;

DETAILED DESCRIPTION OF PREFERRED EMBODIMENTS

A shelter for protection against wind and blast events is disclosed herein with respect to exemplary embodiments. The embodiments are disclosed for illustration of the shelter and are not limiting except as defined in the appended claims.

Figure 1:
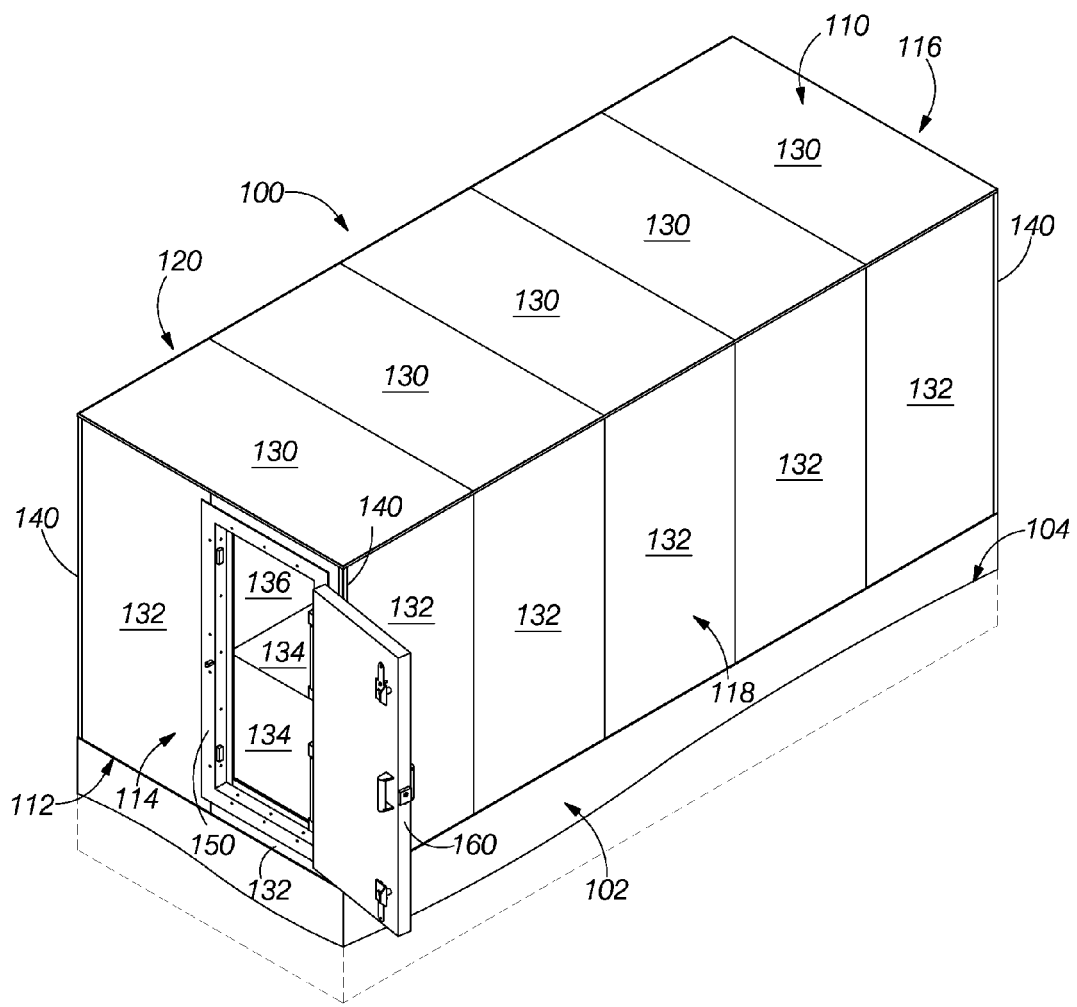
FIG. 1 illustrates a perspective view of a completed shelter mounted on a foundation with a blast resistant door open to permit access to the interior of the shelter.

FIG. 1 illustrates a perspective view of a shelter 100 mounted on a foundation 102, which may comprise a poured footing as described below, a poured slab, a plurality of poured or driven piers or pilings, or another suitable type of supporting system for the shelter disclosed herein. In the illustrated embodiment, the foundation comprises includes a portion (shown in hidden lines) that extends below the surface of the ground 104 on which the shelter is placed. The construction of the foundation using reinforced concrete and other suitable materials is well known to a person of skill in the art and is not described in detail herein. As discussed below, the shelter is secured to the foundation by one or more tie-down systems (not shown in FIG. 1).

In the illustrated embodiment, the shelter 100 is shaped as a generally rectangular parallelepiped (or cuboid) having all sides and the top and bottom shaped as rectangles. In the illustrated embodiment, the shelter comprises a top (roof) 110, a bottom (floor) 112, a first (near) end wall 114, a second (far) end wall 116 (only two edges shown), a first (near) side wall 118 and a second (far) side wall 120 (only two edges shown).

The roof 110 is sheeted with a plurality of roof panels 130, the near and far end walls 114, 116, and the near and far side walls 118, 120 are sheeted with a plurality of outer wall panels 132. The bottom 112 is sheeted with a plurality of upper floor panels 134. The inner surface of the second side wall 120 is sheeted with a plurality of inner wall panels 136. The other inner surfaces (not shown) of the near and far end walls 114, 116, the near side wall 118 are also sheeted with a plurality of inner wall panels. The inside ceiling of the shelter is sheeted with a plurality of ceiling panels (not shown). The various panels are described in more detail below. In the illustrated embodiment, each of the four corners of the shelter is protected by a respective corner protector 140 (only shown for the three visible corners in FIG. 1).

The illustrated shelter 100 has nominal dimensions of approximately 8 feet by 8 feet at the near end wall 114 and the far end wall 116, 8 feet by 20 feet for the near side wall 118 and the far side wall 120, and 8 feet by 20 feet for the top (roof) 110 and the bottom (floor) 112. The dimensions are only approximate and are adaptable to a particular requirement. For example, if the foregoing dimensions are considered to be dimensions of the corresponding inner surfaces, then the outer dimensions are greater to accommodate the thicknesses of the wall structures, the top and the bottom and the thickness of the panels (described below) mounted on the inner and outer surfaces of the wall, roof and floor. Furthermore, any or all of the foregoing dimensions of the shelter are readily adapted to increase or decrease any or all of the length, width or height of the shelter. For example, the length of the shelter may be decreased to provide a shelter having nominal dimensions of 8 feet by 8 feet in a plan view and may be increased to provide a shelter having nominal dimensions of 8 feet by 40 feet in the plan view.

In the illustrated embodiment, a portion of the near end wall 114 is removed to accommodate a door frame 150 that supports a blast resistant door 160. The door is shown in the open position in FIG. 1.

Figure 2:
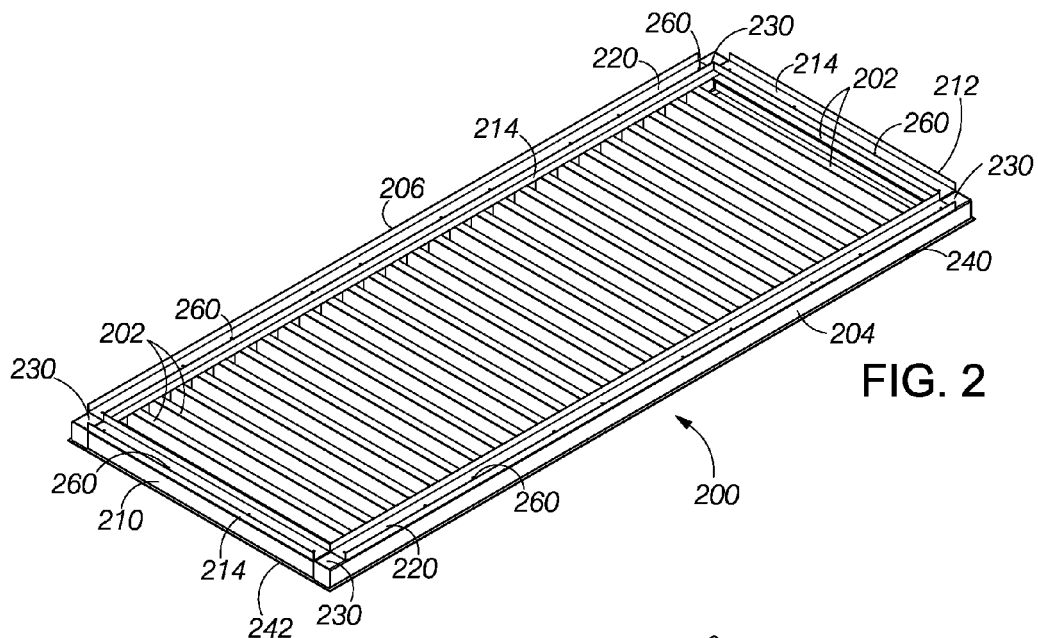
FIG. 2 illustrates a perspective view of the floor structure of the shelter of FIG. 1 viewed from above to show the floor joists extending between the first and second side beams.

FIG. 2 illustrates a perspective view of a floor structure 200 that forms the floor 112 of the shelter 100 of FIG. 1. In FIG. 2, the floor structure is viewed from above to show a plurality of floor joists 202 that extend between a first (near) side beam 204 and a second (far) side beam 206. The two side beams are spaced apart by a first (near) end beam 210 and a second (far) end beam 212 so that the floor structure is generally rectangular. In the illustrated embodiment, the ends of each end beam are secured to the sides of the side beams by welding or other suitable fastening techniques.

Each side beam 204, 206 supports a horizontally disposed respective U-channel mounting track 214 (only the track on the far side beam is shown in FIG. 2). The horizontally disposed mounting track on each side beam is mounted with the flanges facing inwardly toward the opposing side beam. The floor joists are mounted horizontally with the ends of the floor joists engaging the respective horizontally disposed mounting tracks. In the illustrated embodiment, the floor joists are spaced apart by approximately 8 inches center-to-center; however, the joists may be spaced apart by more or less distance in other embodiments. The joists are secured to the mounting tracks by a suitable fastening method, such as, for example, the use of self-tapping sheet metal screws (not shown).

As further shown in FIG. 2, the upper surface of each side beam 204, 206 supports a respective vertically disposed U-channel mounting track 220, and the upper surface of each end beam 210, 212 supports a respective vertically disposed U-channel mounting track 222. Each U-channel mounting track is mounted on the upper surface of respective side or end beam with the flanges of the channel facing upward. The mounting tracks are generally continuous along the length of the respective beam except that each side beam mounting track is shorter than the beam on which it is mounted so that a bare portion 230 of the upper surface at each end of each side beam is exposed. In the illustrated embodiment, the bare portion is generally square and has dimensions of 6 inches by 6 inches.

Figure 3:
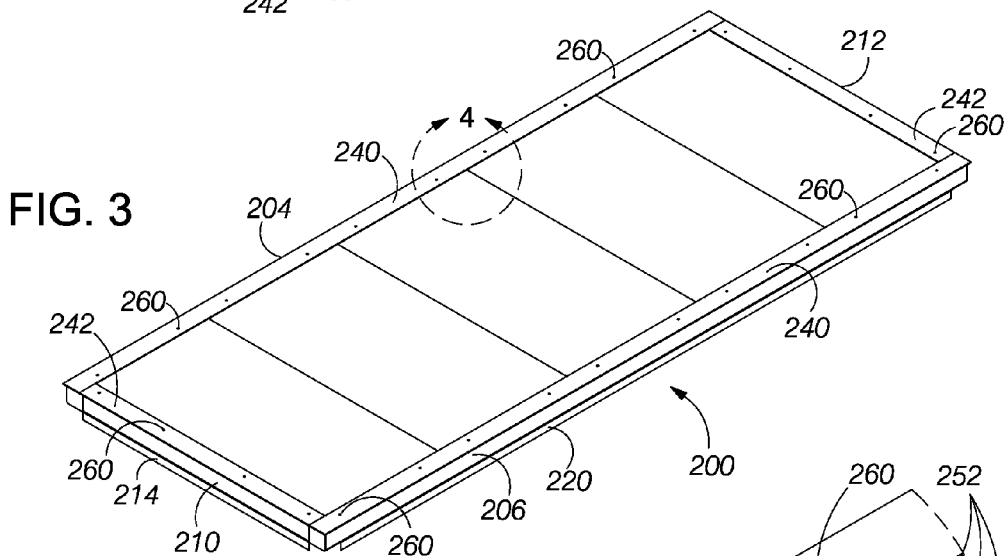
FIG. 3 illustrates a perspective view of floor structure of the shelter of FIG. 1 viewed from below to show the metal sheeting attached to the lower flanges of the floor joists shown in FIG. 2.
Figure 4:
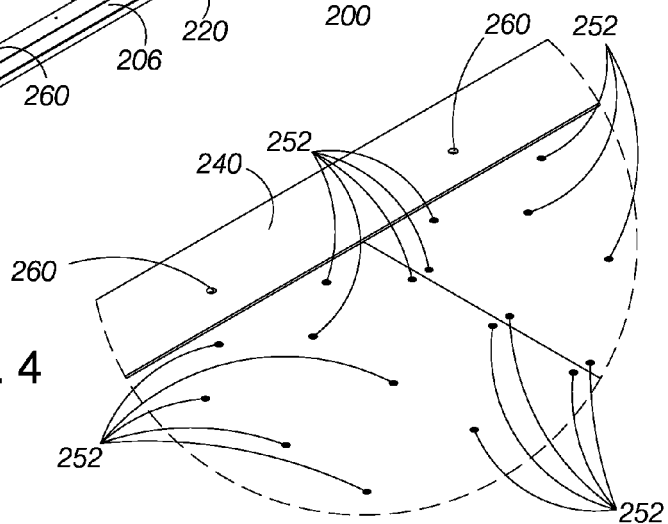
FIG. 4 illustrates an enlarged perspective view of a portion of the floor structure of FIG. 3 taken within the circular area -4- of FIG. 3 to show the through holes and the fasteners in more detail.

FIG. 3 illustrates a perspective view of floor structure 200 of FIG. 2 viewed from below. As shown in FIG. 3, each of the side beams 204, 206 has a respective lower side plate 240 mounted to the lower surface of the beam, and each of the end beams 210, 212 has a respective lower end plate 242 mounted to the lower surface of the beam. The lower side plates and the lower end plates form a rectangular frame on the lower surface of the floor structure. A plurality of metal sheets 250 are mounted to the lower flanges of the floor joists 202 (FIG. 2) and to the horizontally disposed mounting tracks 214 to form a completely closed diaphragm on the lower surface of the floor structure. For example, in the illustrated embodiment, the metal sheets comprise 14-gauge galvanized steel. As shown in the enlarged perspective view in FIG. 4, the metal sheets are advantageously secured to the floor joists and the mounting tracks using a plurality of fasteners 252 (e.g., screws, such as self-tapping sheet metal screws). For example, in certain embodiments, the fasteners are spaced apart along the studs by approximately 6 inches and spaced apart along the mounting tracks by approximately 8 inches.

As further shown in FIGS. 2 and 3, a plurality of through holes 260 are formed through the side beams 204, 206 and the end beams 210, 212 including the vertically disposed mounting tracks 220, 222 and the lower side and end plates 240, 242. The through holes are used to mount the floor structure 200 to the foundation 102 as described below.

Figure 5:
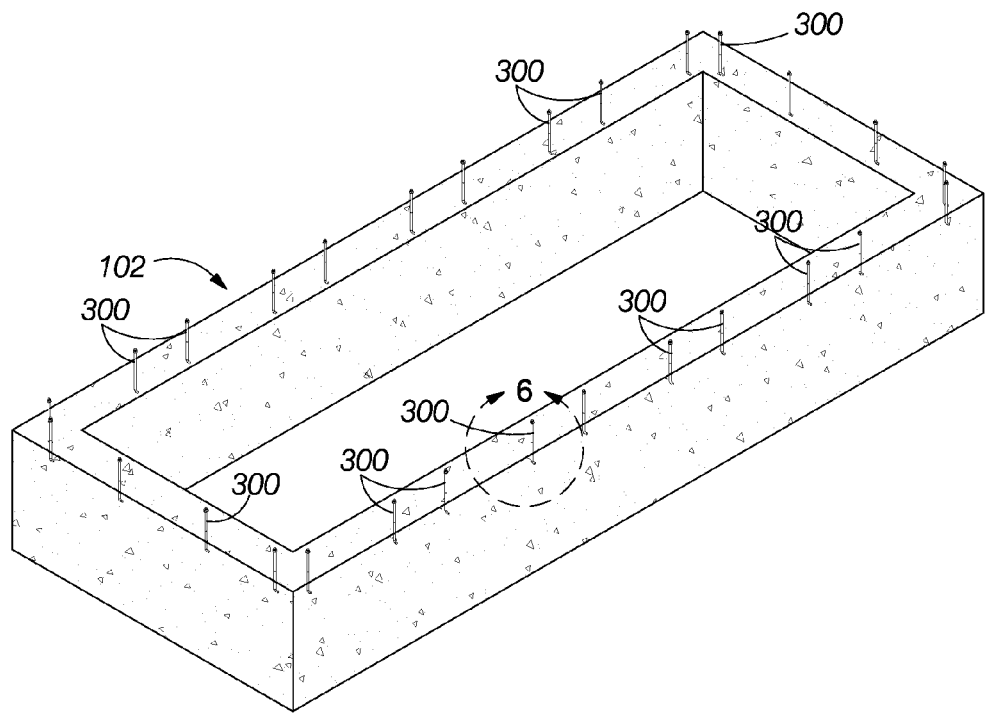
FIG. 5 illustrates an upper perspective view of the foundation prior to installation of the floor structure of FIGS. 2 and 3 and further showing the tie down structures embedded in the concrete and extending upward from the top of the foundation.

FIG. 5 illustrates an upper perspective view of the foundation 102 prior to installation of the floor structure 200 of FIGS. 2 and 3. As illustrated, the foundation comprises a conventional footing configuration formed with reinforced concrete. Prior to pouring the concrete in a suitable form (not shown), a plurality of tie-down systems 300 are positioned at predetermined locations in the form so that the tie-down systems are located in substantially the same relative positions as the through holes 260 in the floor structure described above with respect to FIGS. 2 and 3. For example, a template may be used to properly position the tie-down systems while the concrete is setting. In other embodiments, the tie-down systems may comprise other devices and other methods for securing the tie-down systems to the foundation. Furthermore, as discussed above, the foundation may comprise the poured footing as shown in FIG. 5, or may comprise other suitable foundations, such as, for example, a poured concrete slab, a poured or driven piling or pier system, or the like.

Figure 6:
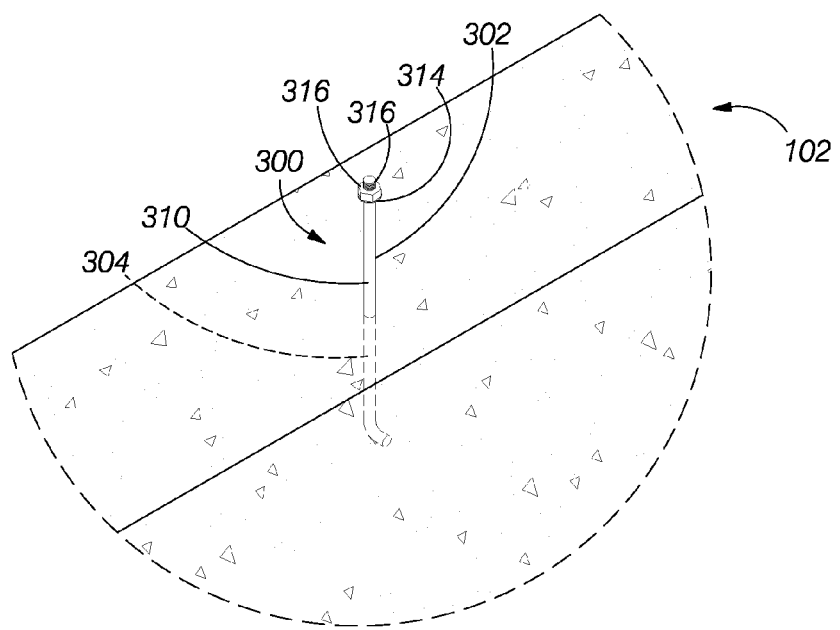
FIG. 6 illustrates an enlarged perspective view of the foundation of FIG. 5 taken within the circular area -6- of FIG. 5 showing a tie down structure in more detail.

As shown in more detail in FIG. 6, a typical tie-down system 300 comprises an anchor bolt 302 that has a lower portion 304 embedded in the concrete. The lower portion may be L-shaped as shown in FIG. 6. The lower portion may also engage reinforcement rods (not shown) to further decrease any likelihood that the anchor bolt can be pulled from the concrete. The anchor bolt has an upper portion 310 that extends from the surface of the concrete by a sufficient distance to pass entirely through the respective lower plate 240, 242, the respective beam 204, 206, 210, 210 and the respective mounting track 220, 222 with a threaded end portion 312 exposed above the respective mounting track.

Figure 7:
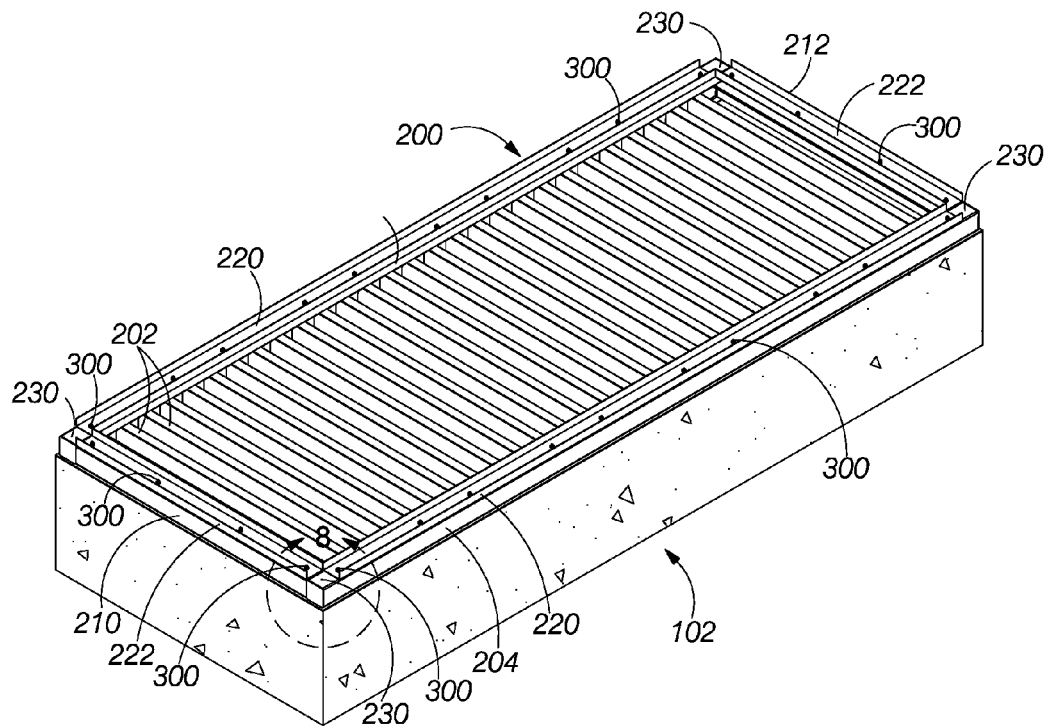
FIG. 7 illustrates a perspective view of the foundation floor structure of FIGS. 2 and 3 mounted on the foundation of FIG. 5.

As shown in FIG. 6, the threaded end portion receives a washer 314 and a threaded nut 316, which are connected to the anchor bolt after installing the floor structure 200 as shown in FIG. 7. In particular, the floor structure is lowered onto the foundation with the anchor bolts passing through the respective through holes 260. The nuts and washers secure the floor structure to the foundation as shown in more detail in FIG. 8.

FIGS. 9A, 9B and 9C illustrate a perspective view, an elevational end view and a flipped perspective view, respectively, of the near end beam 210 of the floor structure 200 of FIGS. 2 and 3. The far end beam 212 is substantially the same as the illustrated end beam. The end beam advantageously comprises a hollow structural section (HSS) steel tube 400 formed in a generally square configuration as shown in the elevational end view of FIG. 6B. In the illustrated embodiment, the sides of the steel tube have dimensions of approximately 6 inches and are approximately 0.25 inch thick. In the illustrated embodiment, the steel tube has an overall length of approximately 82.125 inches.

As shown in FIG. 9A, the vertically disposed U-channel mounting track 222 is secured to one side of the steel tube, which will be the upper surface of the end beam when included as part of the floor structure. In the illustrated embodiment, the mounting track has an overall width of approximately 6 inches and has flanges that extend upward by approximately 2.5 inches. The mounting track is formed by bending ⅛ inch steel into the shape shown in FIGS. 9A-9C. In the illustrated embodiment, the mounting track is secured to the steel tube 400 by a plurality of puddle welds 402. Alternatively, the mounting track is secured to the steel tube by a plurality of mechanical box bolts 404, which are inserted through holes 406 in the mounting track and through corresponding holes (not shown) in the steel tube as illustrated in FIGS. 9D and 9E. A box bolt is an expansion anchor, which is inserted through aligned holes in the mounting track and the steel tube. After insertion, the bolt is tightened to cause a threaded wedge to be drawn up inside the body of the box bolt, which expands the surrounding fins to securely clamp the mounting track to the steel tube. In one embodiment, the puddle welds or the box bolts are advantageously spaced apart by approximately 6 inches. In addition, a plurality of puddle welds 408 are also applied to the edges of the track and the steel tube to further secure the track to the steel tube. The additional puddle welds may also be spaced apart by approximately 6 inches.

The lower plate 242 is mounted to the side opposite the mounting track 222, which will be the lower side of the end beam. As shown in the elevational end view of FIG. 9B, the lower plate is offset from the center of the steel tube 400 of the end beam such that a side lip 410 of the lower plate extends from the side of the steel tube. In one embodiment, the side lip extends approximately $11/16$ inches beyond the side of the steel tube. When the end beam is included in the floor structure, the side lip extends outward from the floor structure. The lower plate is also puddle welded to the steel tube 400 by a plurality of puddle welds 412 or by a plurality of mechanical box bolts similar to the box bolts 404 shown in FIGS. 9D and 9E. The lower plate is further secured to the steel tube by a plurality of puddle welds 414 applied to the intersections of the lower plate and the steel tube. In the illustrated embodiment, the lower plate comprises a generally flat steel plate having a thickness of approximately ¼ inch.

In the illustrated embodiment, the end beam 210 and the mounting track 222 have lengths that are substantially the same and that are selected in accordance with the overall width of the shelter 100. The length of the lower plate 242 is longer than the length of the steel tube 400 of the end beam such that a corresponding end lip 420 extends from each end of the end beam. In the illustrated embodiment, each end lip extends for a distance of approximately $11/16$ inch from the respective end of the beam, generally corresponding to the distance that the side lip 410 extends from the side of the beam.

Figure 10A:
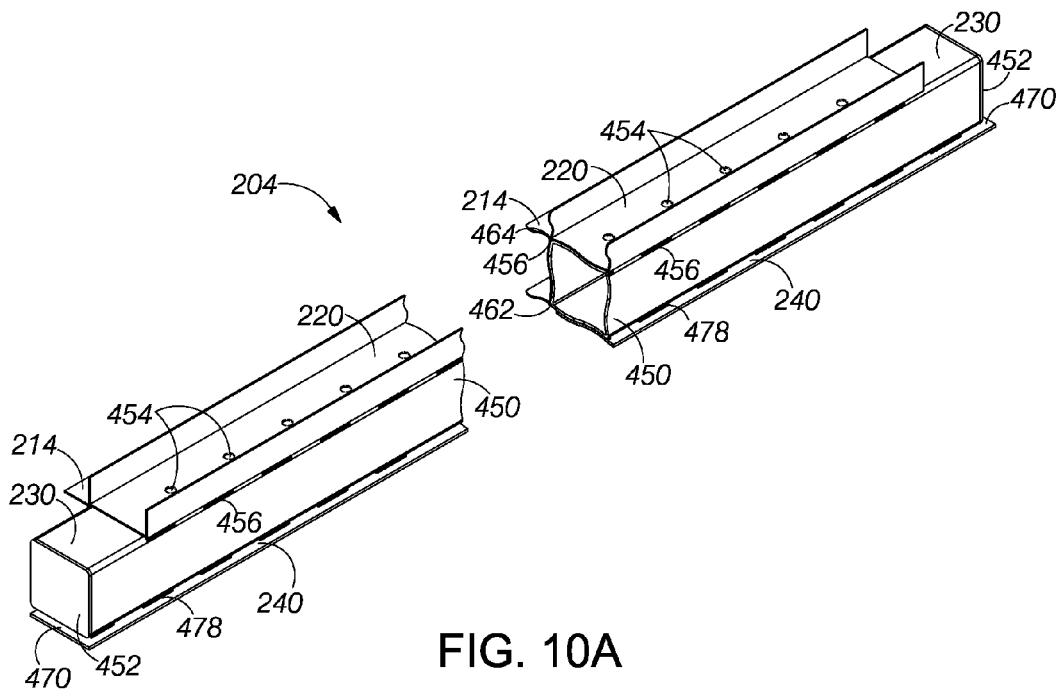
FIGS. 10A, 10B and 10C illustrate a perspective view, an elevational end view and a flipped perspective view, respectively, of one of the side beams of the floor structure of FIGS. 2 and 3, the perspective views of FIGS. 10A and 10B being partially broken way in order to fit the views within the figure margins.
Figure 10B:
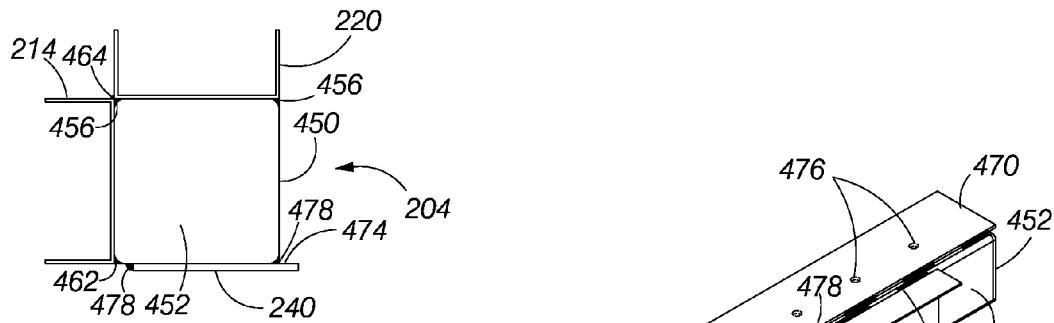
Figure 10C:
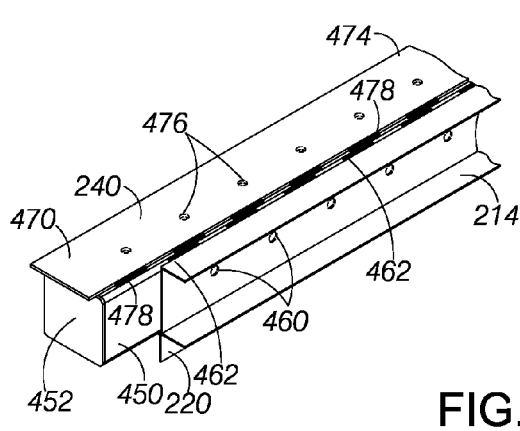

FIGS. 10A, 10B and 10C illustrate a perspective view, an elevational end view and a flipped perspective view, respectively, of the near side beam 204 of the floor structure 200 of FIGS. 2 and 3. In FIGS. 10A and 10C, the perspective views of the side beam are being broken way in order to fit the views within the figure margins. The side beam advantageously comprises a steel tube 450 having a generally square hollow structural section corresponding to the section of the steel tube 400 of the end beam 210 described above. As shown in FIG. 10A, the vertically disposed U-channel mounting track 220 is secured to a side of the steel tube, which side will become the upper side of the side beam when installed as part of the floor structure of FIGS. 2 and 3. The mounting track is shorter than the steel tube by approximately 11.5 inches, such that when the mounting track is centered on the upper surface of the steel tube, a space of approximately 5¾ inches is exposed at each end of the upper surface of the steel tube. Each end of the steel tube is capped by a generally square plate (end cap) 452 comprising ¼ inch thick steel. The steel plate at each end of the steel tube is advantageously welded to the end of the steel tube to close the open end of the steel tube. Together, the bare upper surface of the steel tube and the upper perimeter of the end cap form a 6-inch by 6-inch square exposed surface that corresponds to the bare portion 230 shown in FIG. 2. As described above, the vertically disposed mounting track is secured to the surface of the steel tube by a plurality of puddle welds 454 or by a corresponding plurality of box bolts similar to the box bolts 404 shown in FIGS. 9D and 9E. The vertically disposed mounting track is further secured to the steel tube by a plurality of puddle welds 456 applied to the intersections of the mounting track and the steel tube.

As further shown in FIGS. 10A-10C, the horizontally-disposed, U-channel mounting track 214 (also shown in FIG. 2) is mounted to one side of the steel tube 450 orthogonal to the upper surface. When the steel beam 204 is installed as part of the floor structure 200, the horizontally disposed mounting track faces inward towards the center of the floor structure as shown in FIG. 2 to support the ends of the steel joists 202, as shown in FIG. 2. The horizontally disposed mounting track has substantially the same length as the vertically disposed mounting track and is centered on the side of the steel tube so that the ends of the two tracks are generally aligned. The horizontally disposed mounting track is secured to the side of the steel tube by a plurality of puddle welds 460 or by a corresponding plurality of box bolts similar to the box bolts 404 shown in FIGS. 9D and 9E. The horizontally disposed mounting track is further secured to the steel tube by a plurality of puddle welds 462 applied to the intersections of the mounting track and the steel tube. In the illustrated embodiment, one flange of the horizontally disposed mounting track is welded directly to the steel tube and the other flange of the horizontally disposed mounting track is secured to an abutting flange of the vertically disposed mounting track by a plurality of puddle welds 464.

As further shown in FIGS. 10A-10C, the lower surface of the steel tube 400 of the side beam 204 supports the plate 240, which is similar to the plate 242 of the end beam 210, as described above in connection with FIGS. 9A-9C. The plate of the side beam has a length that is longer than the length of the steel tube such that an end lip 470 is formed at each end of the steel beam. In the illustrated embodiment, the lip at each end has a length of approximate $11/16$ inch. The plate is offset from the longitudinal centerline of the lower surface of the steel tube such that a side lip 474 of approximately $11/16$ inch extends from the side of the side beam. When the near side beam is installed as part of the floor structure 200, the side lip extends outward away from the center of the floor structure as shown in FIG. 2. The plate is secured to the steel tube by a plurality of spaced apart puddle welds 476 or by a corresponding plurality of box bolts similar to the box bolts 404 shown in FIGS. 9D and 9E. The plate is further secured to the steel tube by a plurality of puddle welds 478 applied to the intersections of the plate and the steel tube.

As shown in FIG. 2, the near end beam 210, the far end beam 212, the near side beam 204, and the far side beam 206 are interconnected to form the illustrated rectangular floor structure 200. The respective ends of the end beams are welded to the bare portions on the sides of the side beams. Furthermore, the ends of the lower plates 242 of the end beams may also be welded to the inner edges of the lower plates 240 of the side beams to strengthen the floor structure. As illustrated in FIG. 5B, the outer vertical sides of the end beams are generally coplanar with the outer surfaces of the respective end caps 252. As further shown in FIG. 7, the horizontally disposed mounting tracks 214 are positioned on the inner surfaces of the side beams to receive the floor joists 202. The vertically disposed mounting tracks 220 of the side beams and the vertically disposed mounting tracks 222 of the end beams are positioned to receive a plurality of wall studs, which are described below.

FIGS. 11A and 11B illustrate a perspective view and an end elevational view of one of the floor joists 202 of the floor structure 200 of FIGS. 2 and 3. Each floor joist has a generally C-shaped cross-section as shown in FIG. 11B. In particular, the floor joists comprises a web 500, first and second flanges 502, and a respective lip 504 that extends from each flange. In the illustrated embodiment, each joist has a height of approximately 6 inches along the web and a width of approximately 2.5 inches long each flange. Each lip extends inwardly by approximately ½ inch. In the illustrated embodiment, each joist has an overall length of approximately 82.375 inches.

FIG. 12 illustrates a perspective view of one of four columns 510 to be mounted perpendicularly to the floor structure 200 of FIGS. 2 and 3. In the illustrated embodiment, each column comprises a generally square shaped hollow steel tube having dimensions of approximately 6 inches by 6 inches. The steel tube advantageously corresponds to the steel tubes used for the side beams 204, 206 and the end beams 210, 212. In particular, the walls of the steel tube are advantageously approximately ¼ inch thick. The steel tube has a length that determines the inside height of the shelter 100. In the illustrated embodiment, the length is approximately 77¾ inches. The length is adjustable in accordance with the desired height for the shelter.

Figure 13:
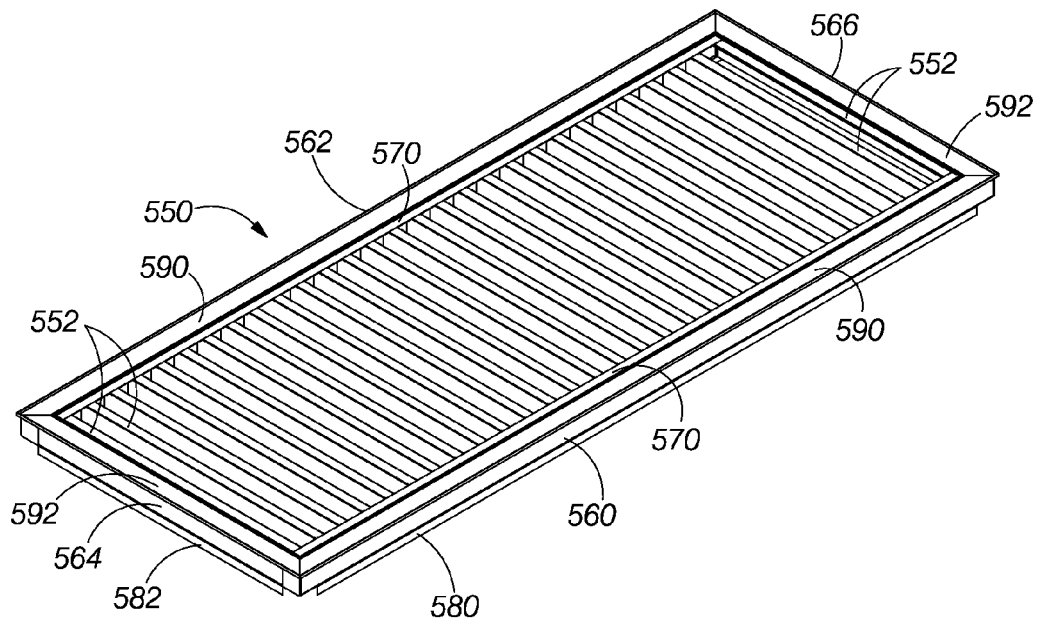
FIG. 13 illustrates a perspective view of the upper surface of a roof structure to be installed on top of the columns of FIG. 12 showing a plurality of ceiling joists spanning between first and second side beams.

FIG. 13 illustrates a perspective view of the upper surface of a roof structure 550 to be installed on top of the columns 510 of FIG. 12 to form the roof 110 of the shelter 100. As illustrated, the roof structure comprises a plurality of roof/ceiling joists 552 that span between a near upper side beam 560 and a far upper side beam 562. The upper side beams are spaced apart by a near upper end beam 564 and a far upper end beam 566. In the illustrated embodiment, the ends of each end beam are secured to the sides of the side beams by welding or other suitable fastening techniques.

Each side beam 560, 562 includes a respective horizontally disposed U-channel mounting track 570 having flanges that face inwardly toward the opposing side beam. The ends of the ceiling joists are supported by the flanges of the horizontally disposed mounting tracks and are secured thereto by a suitable fastening technique (e.g., self-tapping sheet metal screws).

Figure 14:
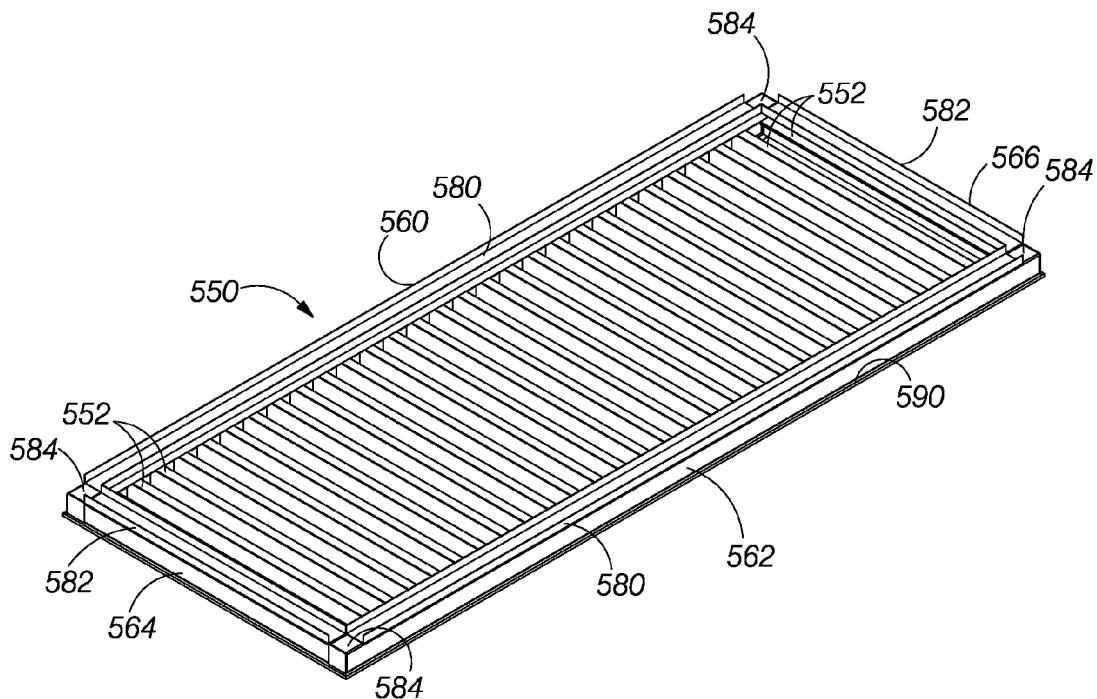
FIG. 14 illustrates a perspective view of the lower surface of the roof structure of FIG. 13.

FIG. 14 illustrates a perspective view of the lower surface of the roof structure 550 of FIG. 13, which shows a respective vertically disposed U-channel mounting track 580 secured to the lower surface of each of the upper side beams 560, 562, and a respective vertically disposed U-channel mounting track 582 secured to the lower surface of each of the upper end beams 564, 566. When the roof structure is oriented as shown in FIG. 13 the flanges of the vertically disposed mounting tracks face downward. As shown in FIG. 14, the mounting tracks on the side beams are shorter than the respective side beams such that a bare mounting area 584 is formed on the lower surface at each end of each side beam.

As further shown in FIG. 13, the upper surface of each of the side beams 560, 562 has a respective L-shaped panel support frame section 590 secured thereto. Similarly, the upper surface of each of the end beams 564, 566 has a respective L-shaped panel support frame section 592 secured thereto. Each panel support frame section has a respective diagonally-cut end such that when the roof structure 550 is formed as shown in FIG. 13, the diagonal ends of each panel support frame section on each end beam engage the corresponding diagonal ends of the panel support frame sections of the adjacent side beams to form a continuous panel support frame around the upper surface of the roof structure.

Figure 15A:
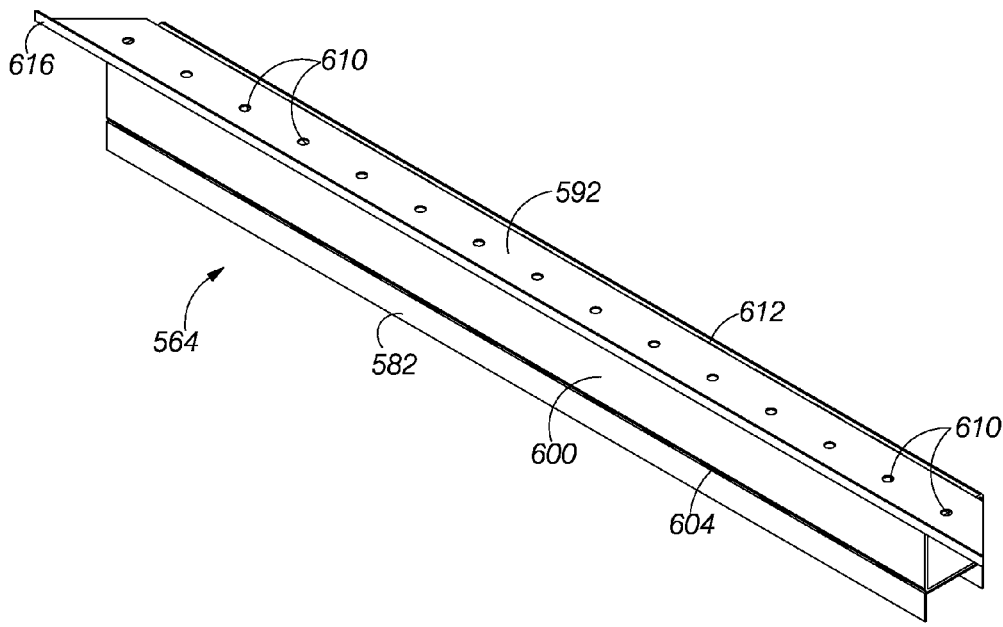
FIGS. 15A, 15B and 15C illustrate a perspective view, an elevational end view and a flipped perspective view, respectively, of one of the end beams of the roof structure of FIGS. 13 and 14.
Figure 15B:
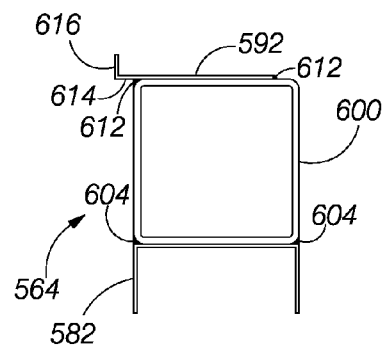
Figure 15C:
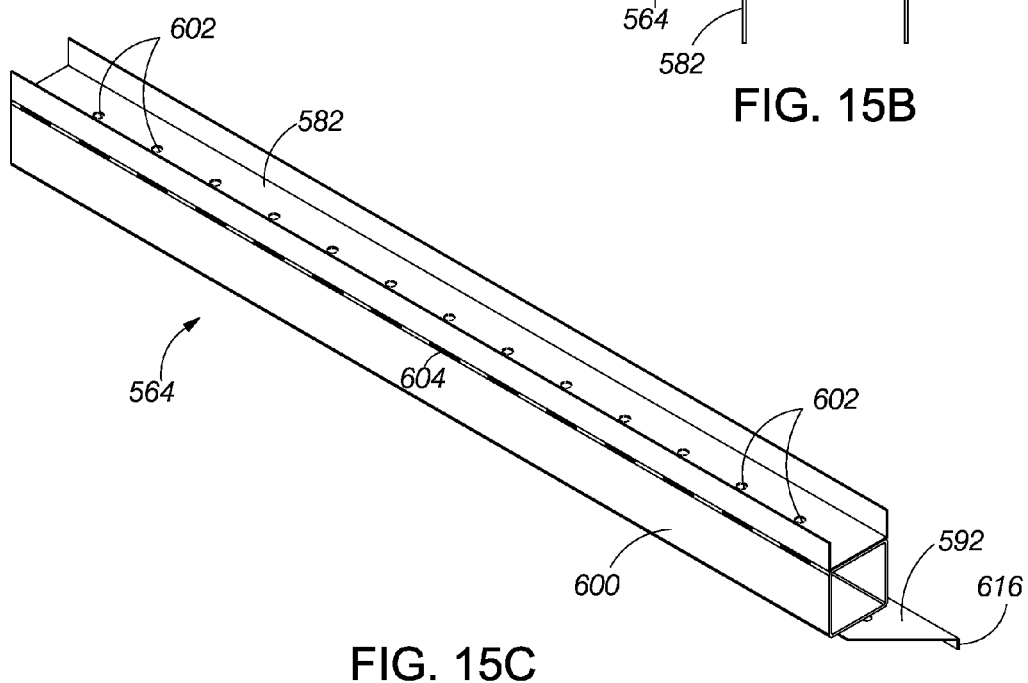

FIGS. 15A, 15B and 15C illustrate a perspective view, an elevational end view and a flipped perspective view, respectively, of the near end beam 564 of the roof structure 550 of FIGS. 13 and 14. The far end beam 566 has a corresponding structure. The end beam comprises a generally square-shaped hollow steel tube 600 having dimensions corresponding to the steel tubes of the beams of the floor structure 200 described above. The vertically disposed U-channel mounting track 582 is secured to the lower surface of the steel tube by a plurality of puddle welds 602 as shown in FIG. 15C or by a plurality of mechanical box bolts as described above in connection with FIGS. 9D and 9E. The vertically disposed U-channel mounting track is further secured to the steel tube by a plurality of puddle welds 604 applied to the intersections of the mounting track and the steel tube. The mounting track has a length that is substantially the same as the length of the steel tube (e.g., approximately 84 inches).

The L-shaped panel support frame section 592 is secured to the upper surface of the steel tube as shown in FIG. 15A. The frame section is secured to the steel tube by a plurality of puddle welds 610 or by a plurality of mechanical box bolts as described above in connection with FIGS. 9D and 9E. The frame section is further secured to the steel tube by a plurality of puddle welds 612 applied to the intersections of the frame section and the steel tube. As shown in FIG. 15B, the frame section has an overall width that is approximately the same as the width of the steel tube. The center of the frame section is offset from the center of the steel tube such that a lip 614 extends outward from the side of the steel tube. A flange 616 extends upward from the end of the lip to form the "L" shape of the frame section. In the illustrated embodiment, the lip extends outward from the side of the steel tube by approximately xxx inch, and the flange extends upward from the top of the panel section by approximately ⅝ inch. As further shown in FIGS. 15A and 15C, the panel support frame section 592 has a length greater than the length of the steel to such that the end of the frame section extends beyond the end of the steel tube by approximately 6¹⁹⁄₃₂ inches. The extended end of the frame section is cut diagonally inward at approximately 45° to form a mitered end 614.

Figure 16A:
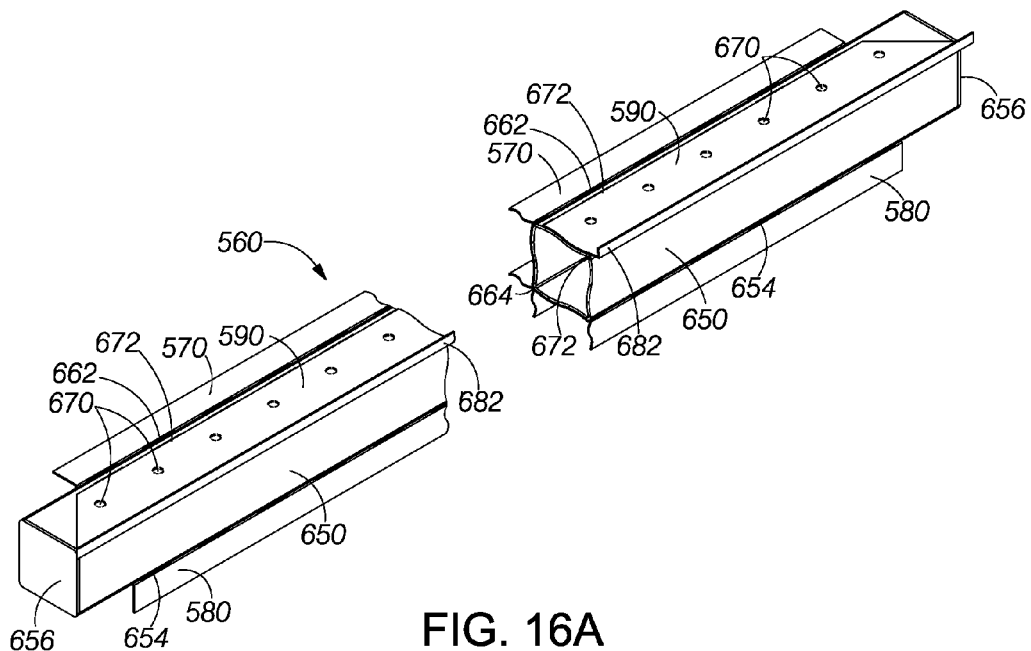
FIGS. 16A, 16B and 16C illustrate a perspective view, an elevational end view and a flipped perspective view, respectively, of one of the side beams of the roof structure of FIGS. 13 and 14, the perspective views of FIGS. 16A and 16B being partially broken way in order to fit the views within the figure margins.
Figure 16B:
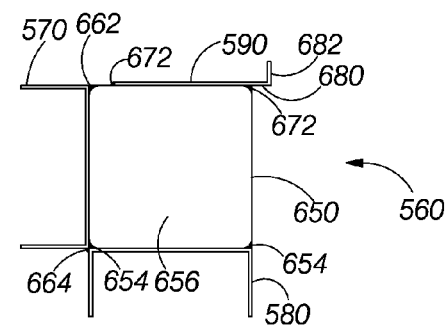
Figure 16C:
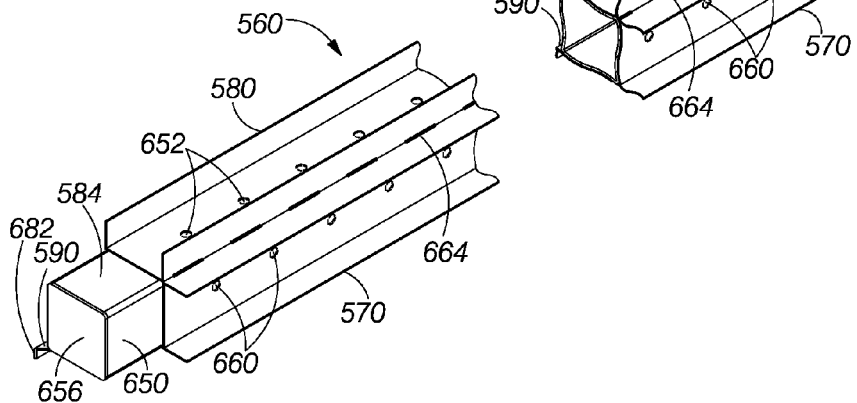

FIGS. 16A, 16B and 16C illustrate a perspective view, an elevational end view and a flipped perspective view, respectively, of the upper near side beam 560 of the roof structure 550 of FIGS. 13 and 14. The far side beam 562 has a similar structure. The perspective views of FIGS. 16A and 16B are partially broken way in order to fit the views within the figure margins. The side beam comprises a generally square shaped steel tube 650 having a structure corresponding to the structure of the steel tubes described above.

The vertically disposed U-channel mounting track 580 is secured to the lower surface of the steel tube 650 by a plurality of puddle welds 652 as shown in FIG. 16C or by a plurality of mechanical box bolts as described above in connection with FIGS. 9D and 9E. The vertically disposed U-channel mounting track is further secured to the steel tube by a plurality of puddle welds 654 applied to the intersections of the mounting track and the steel tube. The mounting track has a length that is less than the length of the steel tube by approximately 11½ inches. The mounting track is centered on the lower surface of the steel tube such that approximately 5¾ inches of the steel tube extends beyond the end of the mounting track. Each end of each steel tube is capped by a generally square shaped steel plate 656 that has a thickness of approximately ¼ inch, as described above. Accordingly, the bare portion 584 is formed at each end of the lower surface of the steel tube.

As shown in FIG. 16C, the horizontally disposed U-channel mounting track 570 is secured to a side surface of the steel tube 650 by a plurality of puddle welds 660 or by a plurality of mechanical box bolts as described above in connection with FIGS. 9D and 9E. The horizontally disposed U-channel mounting track is further secured to the steel tube by a plurality of puddle welds 662 applied to the intersections of the mounting track and the steel tube. In the illustrated embodiment, one flange of the horizontally disposed mounting track is welded directly to the steel tube and the other flange of the horizontally disposed mounting track is secured to an abutting flange of the vertically disposed U-channel mounting track by a plurality of puddle welds 664. The flanges of the horizontally disposed mounting track are directed inwardly when the upper near side beam 560 is integrated into the roof structure 550.

The L-shaped panel support frame section 590 of the near side beam 560 is secured to the upper surface of the steel tube as shown in FIG. 16A. The frame section is secured to the steel tube by a plurality of puddle welds 670 or by a plurality of mechanical box bolts as described above in connection with FIGS. 9D and 9E. The frame section is further secured to the steel tube by a plurality of puddle welds 672 applied to the intersections of the frame section and the steel tube. As shown in FIG. 16B, the frame section has an overall width that is approximately the same as the width of the steel tube. The center of the frame section is offset from the center of the steel tube such that a lip 680 extends outward from the side of the steel tube. A flange 682 extends upward from the end of the lip to form the "L" shape of the frame section. In the illustrated embodiment, the lip extends outward from the side of the steel tube by approximately ¹¹⁄₁₆ inch, and the flange extends upward from the top of the panel section by approximately ⅝ inch. As further shown in FIGS. 16A and 16C, the panel support frame section 590 has a length greater than the length of the steel tube such that the end of the frame section extends is substantially even with the plane of the end cap 654. The end of the frame section is cut diagonally inward at approximately 45° to form a mitered end 690.

When the roof structure 550 is completed as shown in FIG. 13, the mitered ends 690 of the panel support frame sections 590 of the near and far side beams 560, 562 engage the extended mitered ends 614 of the near and far end beams 564, 566 to form a continuous frame around the upper surface of the roof structure. The ends of the steel tubes 582 of the end beams are welded to the sides of the steel tubes 650 of the side beams and the mitered ends are welded together to form a fully interconnected roof structure. The ceiling joists 552 are secured to the horizontally disposed mounting tracks 570 of the near and far side beams. The ceiling joists advantageously have the same or a similar structure to the floor joists illustrated in FIGS. 11A and 11B. In the illustrated embodiment, the ceiling joists are spaced apart by approximately 8 inches center-to-center; however, the joists may be spaced apart by more or less distance in other embodiments.

Figure 17:
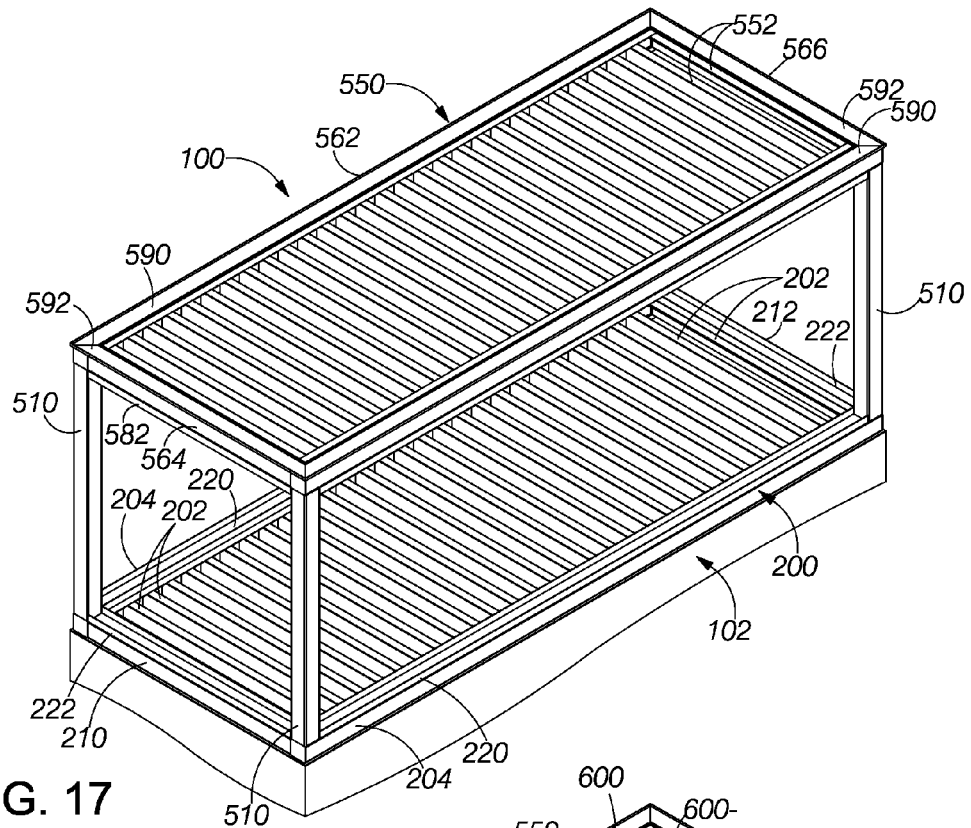
FIG. 17 illustrates a perspective view of the partially erected structure with the columns of FIG. 12 supporting the roof structure of FIGS. 13 and 14 above the floor structure of FIGS. 2 and 3.

FIG. 17 illustrates a perspective view of the partially erected shelter 100 with four of the columns 510 of FIG. 12 supporting the roof structure 550 of FIGS. 13 and 14 above the floor structure 200 of FIGS. 2 and 3. The lower end of each column is welded to the bare portions 230 (FIG. 2) on the upper surfaces of the lower near and far side beams 204, 206 of the floor structure. The upper end of each column is welded to the bare portions 584 (FIG. 14) of the lower surfaces of the upper near and far side beams 560, 562 of the roof structure. Although only four columns are incorporated into the illustrated embodiment, additional columns may be used for longer shelters.

Figure 18:
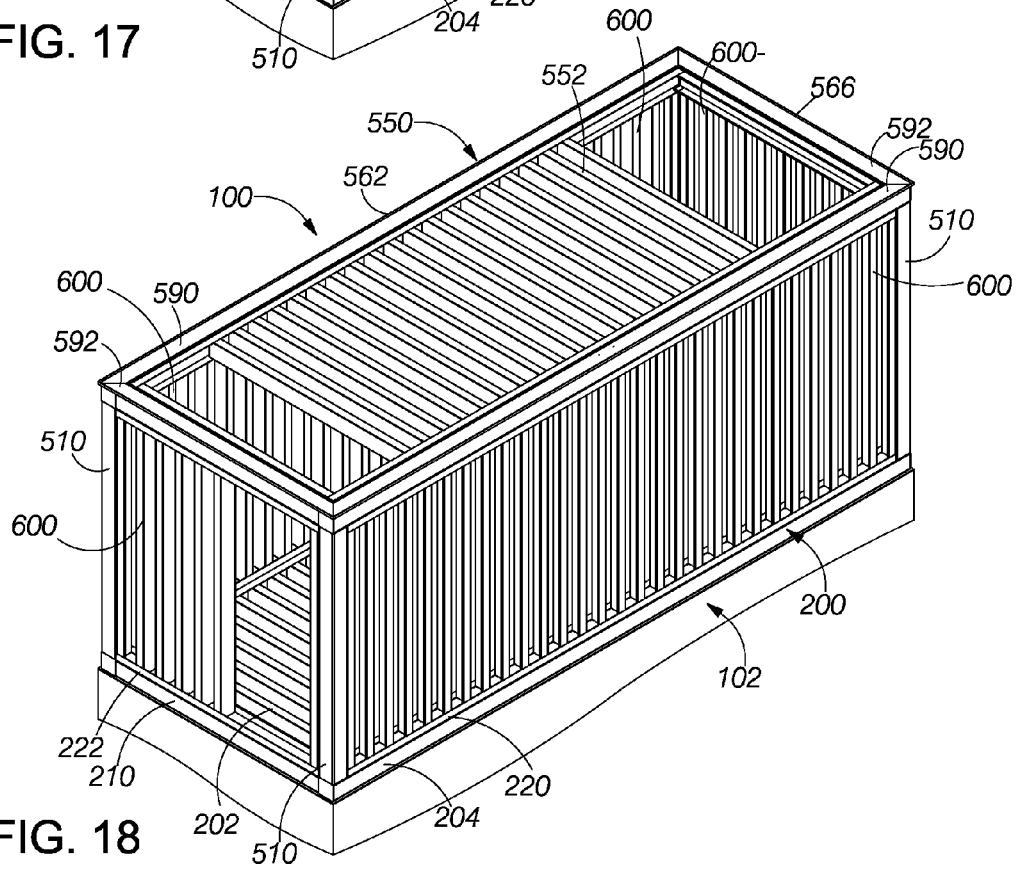
FIG. 18 illustrates a perspective view of the structure of FIG. 17 with a plurality of wall studs mounted between the U-channel mounting tracks of the floor structure and the U-channel mounting tracks of the roof structure on the two side walls of the structure and the front and rear end walls of the structure, wherein a portion of the ceiling joists are removed to show the wall studs on the second side and the second end.

FIG. 18 illustrates a perspective view of the structure of FIG. 17 with a plurality of wall studs 600 mounted between the U-channel mounting tracks 220, 222 of the floor structure and the U-channel mounting tracks of the roof structure on the two side walls of the structure and the front and rear end walls of the structure. In FIG. 18, a number of the ceiling joists 552 are not shown in order to show the wall studs on the second side wall and the second end wall of the structure. The wall studs are secured to the mounting tracks by suitable fastening techniques such as, for example, self-tapping sheet-metal screws. Other fastening techniques may also be used. In the illustrated embodiment, the studs are spaced apart by approximately 8 inches center-to-center; however, the studs may be spaced further apart in other embodiments.

Figure 19:
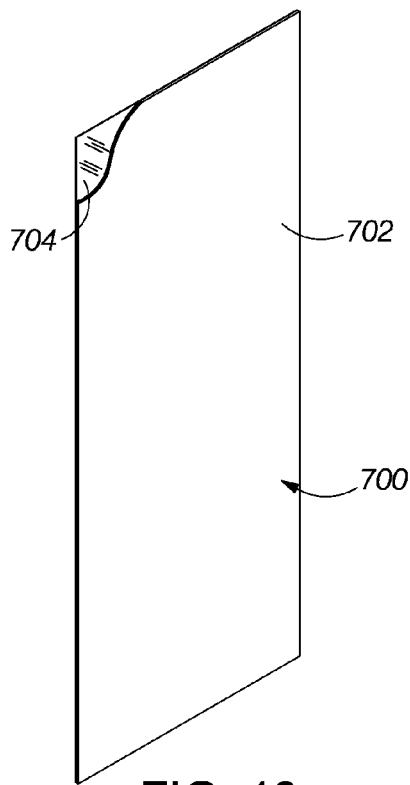
FIG. 19 illustrates a perspective view of an exemplary panel to be installed on the structure of FIG. 17, the panel comprising a non-combustible board laminated to a metallic sheet such as steel (shown in the broken away portion of the non-combustible board)

FIG. 19 illustrates a perspective view of an exemplary panel 700 to be installed on the structure of FIG. 17. The panel comprises a non-combustible board 702 laminated to a metallic sheet 704, as described, for example, in U.S. Pat. No. 8,079,188 for Energy Absorbing Blast Wall for Building Structure, which is incorporated herein by reference. In the illustrated embodiment, each of the roof panels 130, outer wall panels 132, floor panels 134, inner wall panels 136 and ceiling panels (not shown) comprises a version of the panel 704 configured with a selected length and width and further configured with a selected thickness (gauge) of the metallic sheet and a selected thickness and composition for the non-combustible board.

In the illustrated embodiment, the metallic sheet 704 of the panel 700 comprises steel, such as, for example, 14-gauge steel having a nominal thickness of approximately 0.075 inch. Although described herein as steel, other metallic sheets (e.g., aluminum) may also be used. Although described herein as a panel having a common gauge of steel for all panels, it should be understood that the shelter 100 may be constructed with panels with different gauges of steel. For example, the panels on the inner walls may be constructed with a thinner gauge of steel (e.g., 20-gauge steel).

In the illustrated embodiment, the non-combustible board 702 of the panel 700 has a nominal thickness of approximately 0.5 inch. In certain embodiments, the non-combustible board comprises a non-combustible material such as Durock® brand underlayment available from USG Corporation headquartered in Chicago, Ill.; PermaBase® brand cement board available from National Gypsum Company headquartered in Charlotte, N.C.; and Hardiebacker 500® brand cement backerboard available from James Hardie Building Products in Mission Viejo, Calif. Boards comprising other non-combustible materials may also be used. In certain embodiments, the non-combustible board may have different thicknesses and may have different materials in accordance with the location where the panels. For example, the floor panels described below may be thicker or may have a more wear resistant non-combustible board than the panels used in other locations. The inner wall panels may comprise sheet-rock or other wallboard materials. As used herein and in the appended claims, the term "board" encompasses a range of non-combustible materials that are attachable to the metallic sheet 704.

In the illustrated embodiment, the non-combustible board 702 and the metallic sheet 704 of each panel have nominal widths of approximately 48 inches. The lengths of the panels are chosen to span the required distances between the beams of the shelter 100 as described below. Furthermore, because some of the expanses between the beams are not multiples of 48 inches, certain panels are trimmed to fit at one or both edges of some of the expanses.

Figure 20:
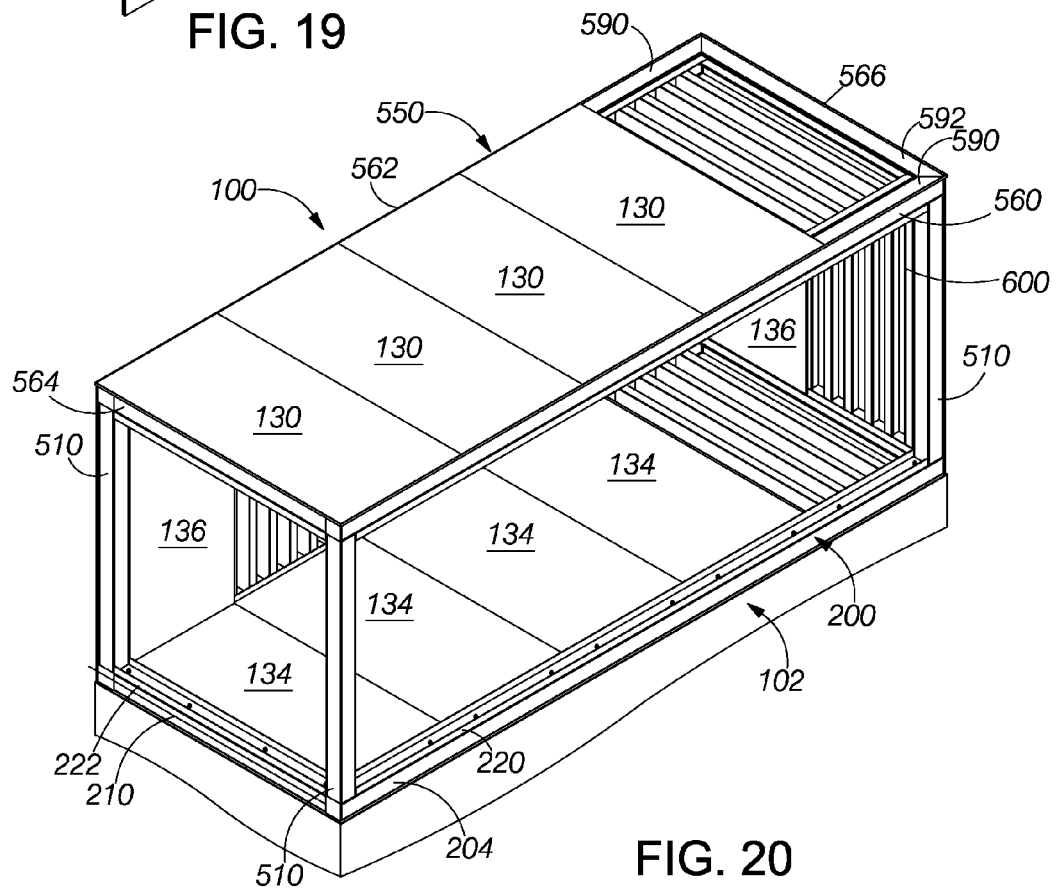
FIG. 20 illustrates a perspective view of the structure of FIG. 17 with a plurality of the panels of FIG. 19 of appropriate sizes installed on the floor joists, the roof joists, the studs of the far side wall and the studs of the rear end wall, the studs of the near side wall and the near end wall not being shown in FIG. 20 to allow the inner panels and floor panels to be viewed.

FIG. 20 illustrates a perspective view of the structure of FIG. 17 with a plurality of the panels 700 of FIG. 19 of appropriate sizes installed on the floor joists 202 of the floor structure 200, the roof joists 552 of the roof structure 550, the studs 600 of the far side wall and the rear end wall. In FIG. 20, the studs of the near side wall and the near end wall are not shown to allow the inner panels and floor panels to be viewed. In FIG. 20, the panels are numbered in accordance with the numbering in FIG. 1.

As shown in FIG. 20, the roof panels 130 are installed on the upper flanges of the ceiling joists 552 to form the outer surface of the roof structure 550. In the illustrated embodiment, the roof panels have a nominal length of 8 feet such that the panels extend from the inside of the flanges 682 of the lips 680 (see FIG. 16B) of the L-shaped panel support frame sections 590 of the upper near and far end beams 560, 562 of the roof structure. The roof panels are installed on the ceiling joists with the metallic sheet 704 of each panel abutting the upper flanges of the ceiling joists and with the non-combustible board 702 facing upward away from the ceiling joists. The roof panels are secured to the ceiling joists using suitable fasteners such as, for example, self-tapping sheet metal screws (not shown). In the illustrated embodiment, the roof panels and the other panels described below are secured in the manner illustrated in FIG. 4 with respect to the metal sheets 250 beneath the floor structure 200.

As illustrated in FIG. 20, five adjacent roof panels 130 (one not shown) are sufficient to cover the roof structure 550 within the frame formed by the panel support frame sections 590, 592. If the length of the frame between the flanges 612 of the frame sections 592 of the upper near and far end beams 564, 566 of the roof structure is more or less than a multiple of the panel widths, the width of at least one roof panel may be trimmed to fit within the frame. After completing the roof panel installation, the roof panels may be sealed with a suitable material to prevent moisture penetration along the edges of the panels and to protect the exposed surfaces of the panels from the weather.

As further shown in FIG. 20, the inside wall panels 136 are installed on the inside flanges of the wall studs forming the far side wall and the far end wall. Although not shown in FIG. 20, it is understood that corresponding inside wall panels are installed on the inside flanges of the studs (not shown) of the near end wall and the near side wall. In the illustrated embodiment, the inside wall panels have nominal widths of approximately 48 inches and have nominal lengths of approximately 89.5 inches. The actual length of each inside wall panel is determined by the distance between the floor structure 200 and the roof structure 550 when the wall panels are installed. The length may be determined by the order in which the various inside panels (floor, wall and ceiling panels) are installed. The width of one or more of the inside wall panels may be trimmed to adjust the width to fit the wall panels within the boundaries defined by the spacing between the outer columns 510. The inside wall panels are installed on the wall studs with the metallic sheet 704 of each panel abutting the inside flanges of the wall studs and with the non-combustible board 702 facing towards the interior of the shelter 100. In similar manner to the roof panels 130, the inside wall panels are secured to the inside flanges of the wall studs using self-tapping sheet metal screws or other suitable fastening techniques.

As further shown in FIG. 20, the floor panels 134 are installed on the top flanges of the floor joists 202. In the illustrated embodiment, each floor panel has a nominal width of approximately 48 inches and has a nominal length of approximately 82.5 inches. The actual length of a floor panel is determined by the distance between the far and near walls when the floor panels are install, which may be determined in part by the order in which the panels (floor and wall panels) are installed. The width of one or more of the floor panels may be trimmed to adjust the width to fit the floor panels within the boundaries defined by the spacing between the near end wall and the front end wall when the floor panels are installed. The floor panels are installed on the floor joists with the metallic sheet 704 of each panel abutting the upper flanges of the floor joists and with the non-combustible board 702 facing upward toward the interior of the shelter 100. In similar manner to the roof panels 130 and the inside wall panels 136, the floor panels are secured to the upper flanges of the floor joists using self-tapping sheet metal screws or other suitable fastening techniques.

Although not shown in FIG. 20, a plurality of ceiling panels (not shown) are installed on the bottom flanges of the ceiling joists 552. In the illustrated embodiment, the ceiling panels are similar to the floor panels 134 and have similar sizes because the ceiling surface area and the floor surface area are substantially the same. It is understood that the ceiling panels may comprise a non-combustible board 702 of a material that differs from the non-combustible board of the floor panels because the ceiling panels are not subjected to the static and dynamic loading applied to the floor panels. For example, the non-combustible board of the ceiling panels may advantageously comprise sheetrock or other wallboard. The ceiling panels are installed on the ceiling joists with the metallic sheet 704 of each panel abutting the lower flanges of the ceiling joists and with the non-combustible board facing downward toward the interior of the shelter 100. The ceiling panels are secured to the lower flanges of the ceiling joists using self-tapping screws or other suitable fastening techniques.

Figure 21:
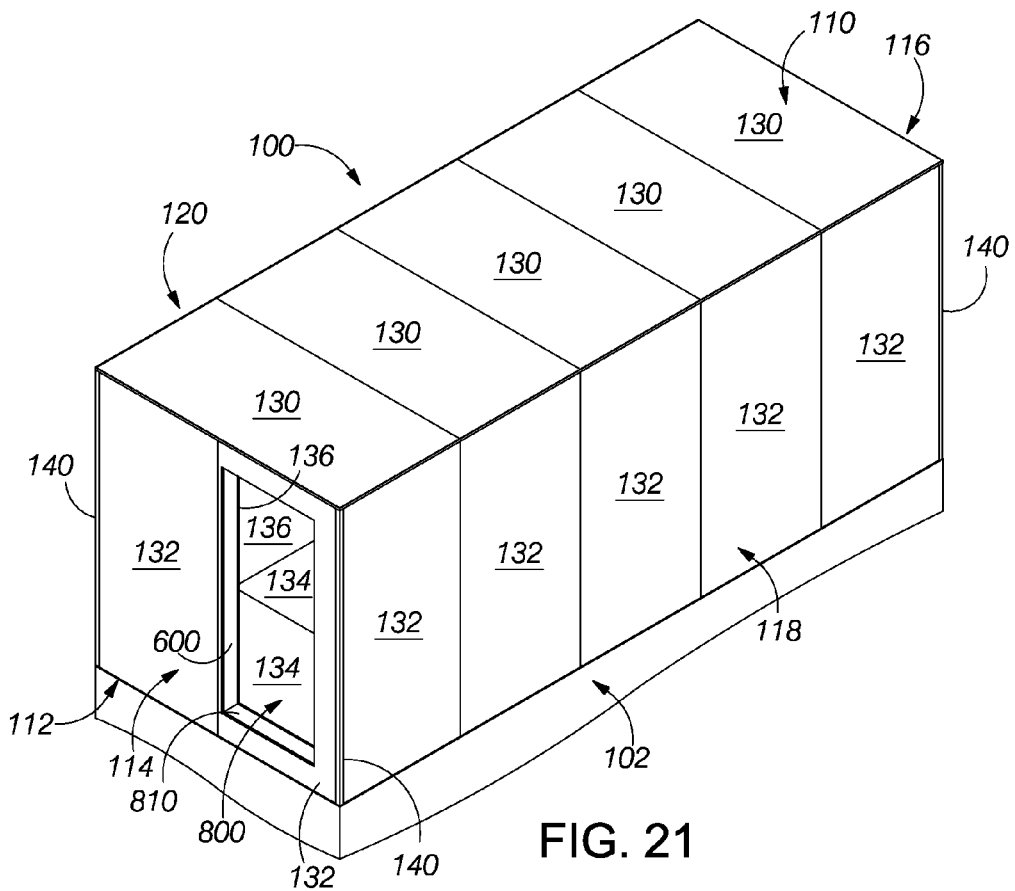
FIG. 21 illustrates a perspective view of the structure of FIG. 17 with the outer and inner panels installed and with the opening formed in the front end wall to receive the door frame.

As illustrated in FIG. 21, the outside wall panels 132 are installed on the outside flanges of the wall studs 600. In the illustrated embodiment, the outside wall panels have nominal widths of approximately 48 inches and have nominal lengths of approximately 102 inches, as determined by the distance between the upper surfaces of the floor plates 240, 242 and the lower surfaces of the panel support frame sections 590, 592. As with the other panels, the actual widths of the outside wall panels may be adjusted by trimming one or more of the wall panels of a particular side wall or end wall.

The roof panels 130, the ceiling panels (not shown), the inside wall panels 136, the outside wall panels 132 and the floor panels 136 may be finished to weatherproof the panels and to improve the appearances and wear-resistance of the panels if desired.

Although the installation of the panels is described above with respect to a particular sequence, the described sequence is for ease of illustration and is not intended to represent a required sequence. For example, it is understood that the outside panels 132 will likely be installed before the inside panels 136.

As further shown in FIG. 22, the four corners where the vertical walls meet may be covered with the outside corner protectors 140, which operate to prevent high velocity winds from entering the gaps between the panels at the corners and thereby preclude any tendency of the panels to separate at the corners. In similar manner, the flanges 612 of the L-shaped panel support frame section 592 of the upper end beams 564 and the flanges 682 of the L-shaped panel support frame section 590 of the upper side beams 562 block air flow beneath the outer edges of the roof panels 130.

As further illustrated in FIG. 21, a plurality of the studs 600 of the near end wall 114 are not installed in order to provide an opening 800 in the near end wall. In the illustrated embodiment, four of the studs are omitted to form an opening having a width of approximately 37.5 inches between the opposing webs of the two studs on either side of the opening, which frame the opening. The inside wall panel 136 and the outside wall panel 132 proximate to the opening are cut to form respective openings corresponding to the width between the two studs framing the opening. The openings in the inside and outside wall panels have a selected height corresponding to the height of the door frame 150 (FIGS. 22A and 22B) to be installed in the opening. A horizontal header (not shown) and a horizontal footer 810 are advantageously installed between the two studs that frame the opening to provide mounting surfaces for the top and bottom of the door frame. Although shown in FIG. 21 as being formed in the near end wall, it is understood that the opening may be formed in one or more of the other end wall 116 or either of the side walls 118, 120.

Figure 22A:
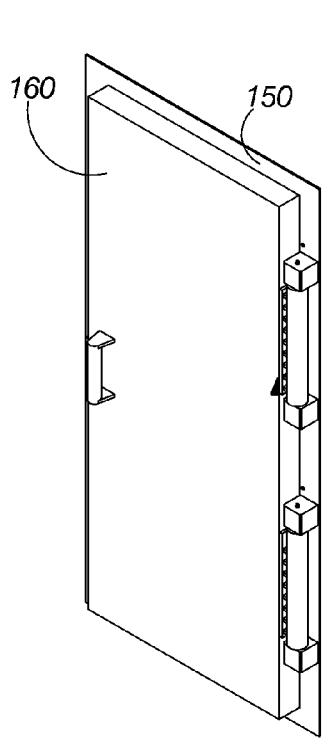
FIGS. 22A and 22B illustrate a front perspective view and a rear perspective view, respectively, of a pre-hung blast-resistant door for installation in the opening in the shelter structure of FIG. 21.
Figure 22B:
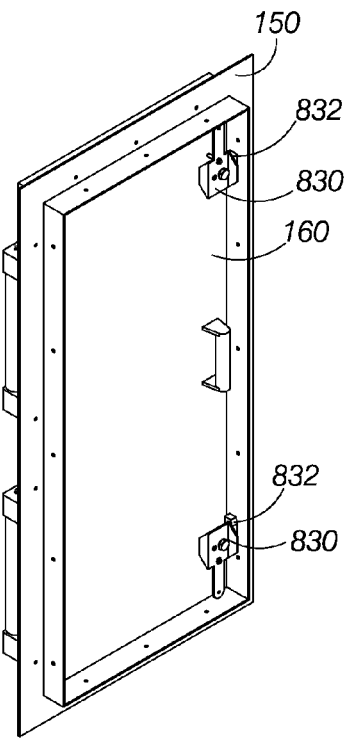

As illustrated in FIGS. 22A and 22B, the door frame 150 supports the blast-resistant door 160. In one embodiment, the door frame and the attached door advantageously comprise a blast-resistant pre-hung blast door such as, for example, an ASR-50-BD blast door, which is commercially available from American Safe Room of Oakland, Oreg. 97462; however, other suitable frames and doors may also be used. An advantage of the illustrated pre-hung blast door of this type is that the door includes a hollow cavity (not shown) between the inner and outer panels of the door so that the door and frame have less mass for shipping and installation. After the door is installed on the shelter 100, properly aligned and secured to the studs, the header and the footer, the hollow door is filled with concrete to enhance the blast resistance of the door. As shown in FIG. 22B, the blast-resistant door includes a pair of inner latches 830. The engagement latches are rotatable from the vertical unengaged positions shown in FIG. 22B to horizontal positions (not shown) to engage a pair of latch engagement blocks 832 on the door frame when the door is closed. The engagement latches secure the door against wind and blast. Although not shown in the FIGS. 22A and 22B, the commercially-available door also advantageously includes a lock mechanism that engages a lock plate on the door frame when the door is closed from the outside when the shelter is not occupied to prevent unwanted entry into the shelter.

Figure 23:
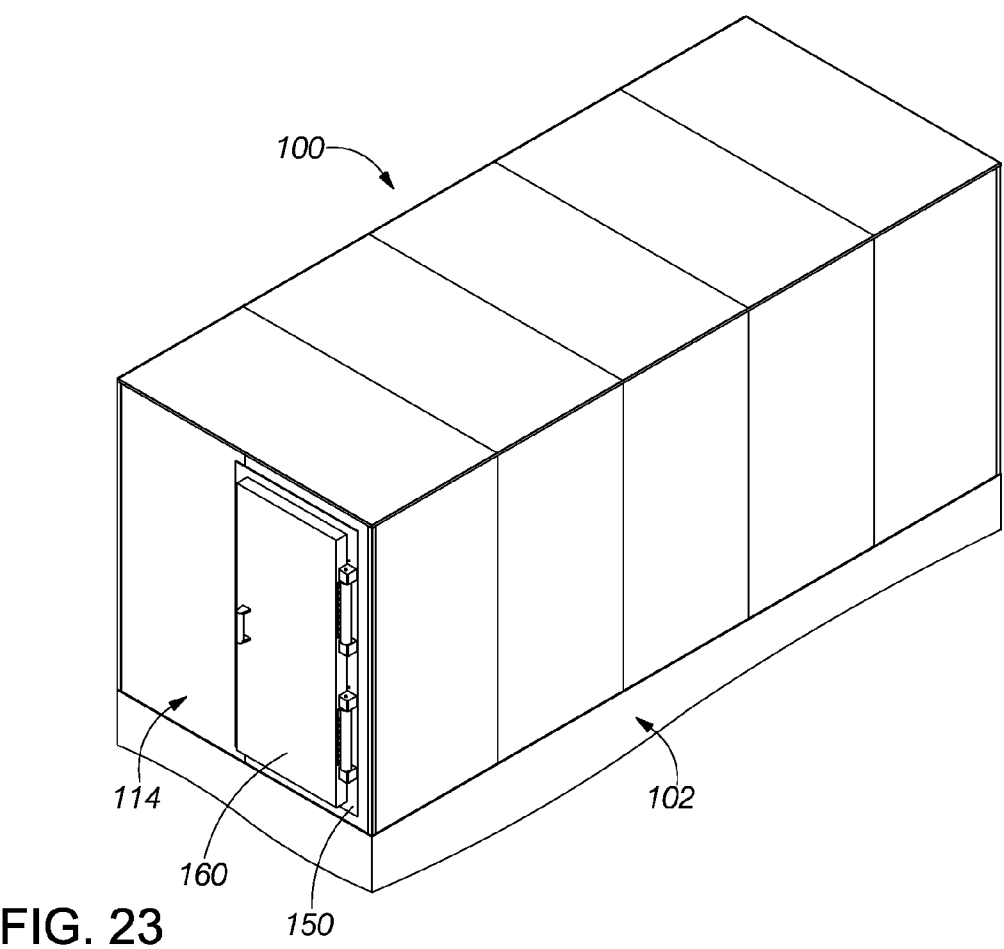
FIG. 23 illustrates a perspective view of the structure of FIG. 21 with a blast-resistant door installed in the opening in the near end wall of the structure, with the door shown in the closed position.

FIG. 23 illustrates a perspective view of the shelter 100 of FIG. 21 with the door frame 150 and an attached blast-resistant door 160 installed in the opening 800 (FIG. 21) in the near end wall 114 of the structure, with the door shown in the closed position.

The floor, roof and walls of the shelter 100 may be further enhanced to provide protection against wind and blast by filling the cavities between the inner wall panels 136 and the outer wall panels 132 with a granular material as described for example in U.S. Pat. No. 8,161,710, for "Projectile-Resistant Wall Structure with Internal Bag," which issued on Apr. 24, 2012. U.S. Pat. No. 8,161,710 is incorporated by reference herein. For example, U.S. Pat. No. 8,161,710 illustrates a ballistic bag filled with such material in FIGS. 12-20. A respective bag is advantageously positioned in the walls between each pair of adjacent studs and filled with the granular material (e.g., sand) to provide additional protection against blast or wind, including protection against projectiles propelled by the blast or wind. In a preferred embodiment, the bags are installed and the granular material added to the bags before installing the outer wall panels. The bags may be held in place between the wall studs using hook and loop material (commercially available, for example, as Velcro® hook and loop fastening material). If additional ballistic protection for the shelter is desired, the cavities between the floor joists, the cavities between the ceiling joists, or both, may also be filed with a granular material in a similar manner before installing the floor panels 134 and the roof panels 130, respectively.

Figure 24:
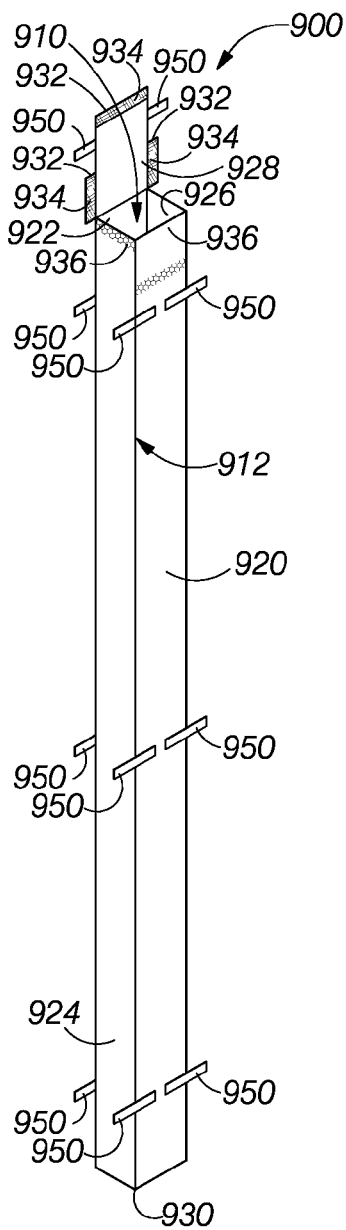
FIG. 24 illustrates a perspective view of a bag that is installable between adjacent pairs of wall studs of the shelter structure, the bag having a re-sealable top portion that is open as shown to receive a granular material within a cavity in the bag.

FIG. 24 illustrates a perspective view of a flexible bag 900 having an empty inner cavity 910. The flexible bag comprises at least one sheet 912 of a woven, high tensile strength fiber. For example, in the illustrated embodiment, the sheet comprises a woven para-aramid fiber, such as, for example, Kevlar® brand aramid fiber from DuPont. The flexible bag may comprise a single sheet formed into a bag in the manner described in FIGS. 14-19 of U.S. Pat. No. 8,161,710. Alternatively, the flexible bag may be formed as a more box-like structure as illustrated in FIG. 24 herein. For example, the flexible bag may advantageously comprise a front side 920, a rear side 922, a left side 924, a right side 926, a first end 928, and a second end 930. The embodiment of the flexible bag illustrated in FIG. 24 may be formed from a single sheet cut into a pattern that can be closed to form the box-like structure, or the bag may be formed from multiple sheets that are interconnected to form the structure. In either case, each seam formed to interconnect sheets or edges of the same sheet is preferably reinforced with reinforcing material (not shown) as described in the cited patent.

Figure 25:
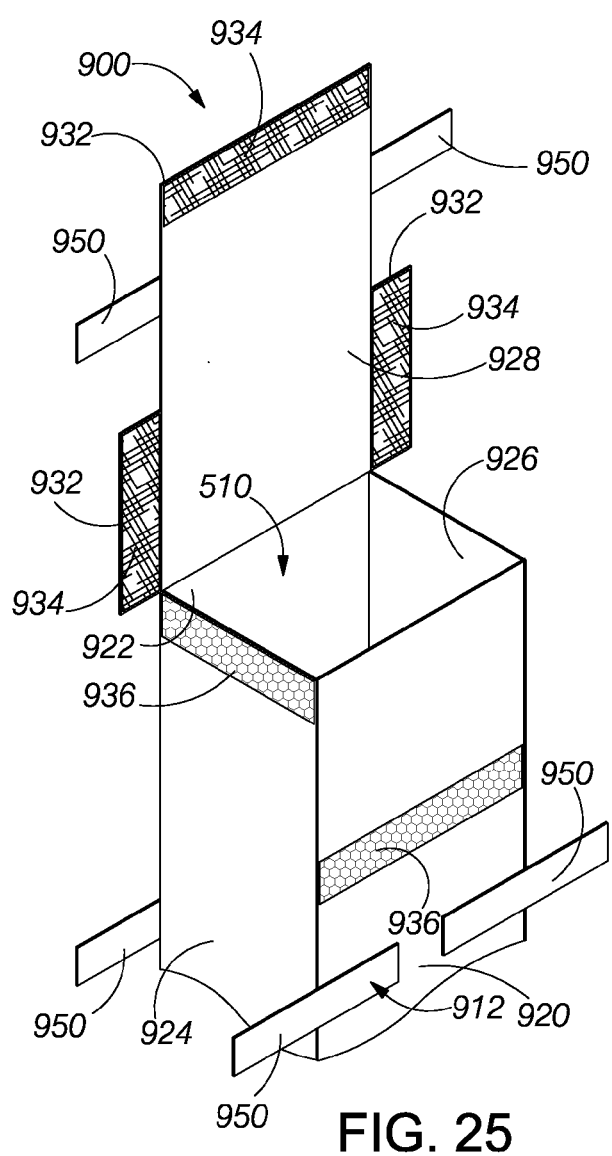
FIG. 25 is an enlarged perspective view of the top portion of the bag of FIG. 24 to show additional detail of the re-sealable top portion.

As shown in the embodiment of FIG. 24, the first end 928 of the flexible bag 900 may be initially left open. The open end allows the inner cavity 910 of the flexible bag to be filled with a suitable material to increase the ballistic protection provided by the woven, high-tensile strength sheet 912 that forms the structure of the bag. After filling, the bag is closed to seal the material within the inner cavity. For example, as shown in the enlarged perspective view of an upper portion of the bag in FIG. 25, the first end of the bag advantageously comprises a plurality of flaps 932 with attached segments 934 of the hook (or loop) portions of hook-and-loop fastening pairs. The uppermost portions of the front side 920, the left side 922 and the right side 924 of the bag include attached segments 936 of the mating loop (or hook) portions of the hook-and-loop fastening pairs. Hook-and-loop fastening pairs are commercially available as Velcro® brand hook-and-loop fasteners from Velcro USA and as similar fasteners from other sources. Other fastening structures may also be used.

In the illustrated embodiment, the inner cavity 910 of the bag 900 is filed with a granular material, such as, for example, sand or gravel. An empty flexible bag is positioned in each space between adjacent wall studs before installing one or both of the inner wall panels 136 or the outer wall panels 130 on a particular section of the end walls 114, 116 or the side walls 118, 120. Each bag is initially adjusted to substantially fill the respective space. To assist in this procedure, the front side 920, the rear side 922, and the first end 928 of each bag may have selected lengths of nylon straps 950 attached thereto. The straps are spaced apart on the front side and the back side and extend outward from the left side 924 and the right side 926 of the bag. For example, in the illustrated embodiment, three straps extend outwardly from each edge of the front side of the bag and three straps extend outwardly from each edge of the rear side of the bag for a total of 12 straps. Two additional straps extend outwardly from the first end of the bag. When positioned in the cavities between the studs, the straps are secured to the flanges of the studs by screws or other suitable fastening devices. When first installed between adjacent studs, the upper end of each bag is left open to allow the bag to be filled with the granular material. The top of the bag is then sealed using the hook and loop fastening systems. After sealing all bags in a particular wall section, the remaining panel (e.g., the outer wall panel) is fastened to the studs to close the wall section.

Figure 26:
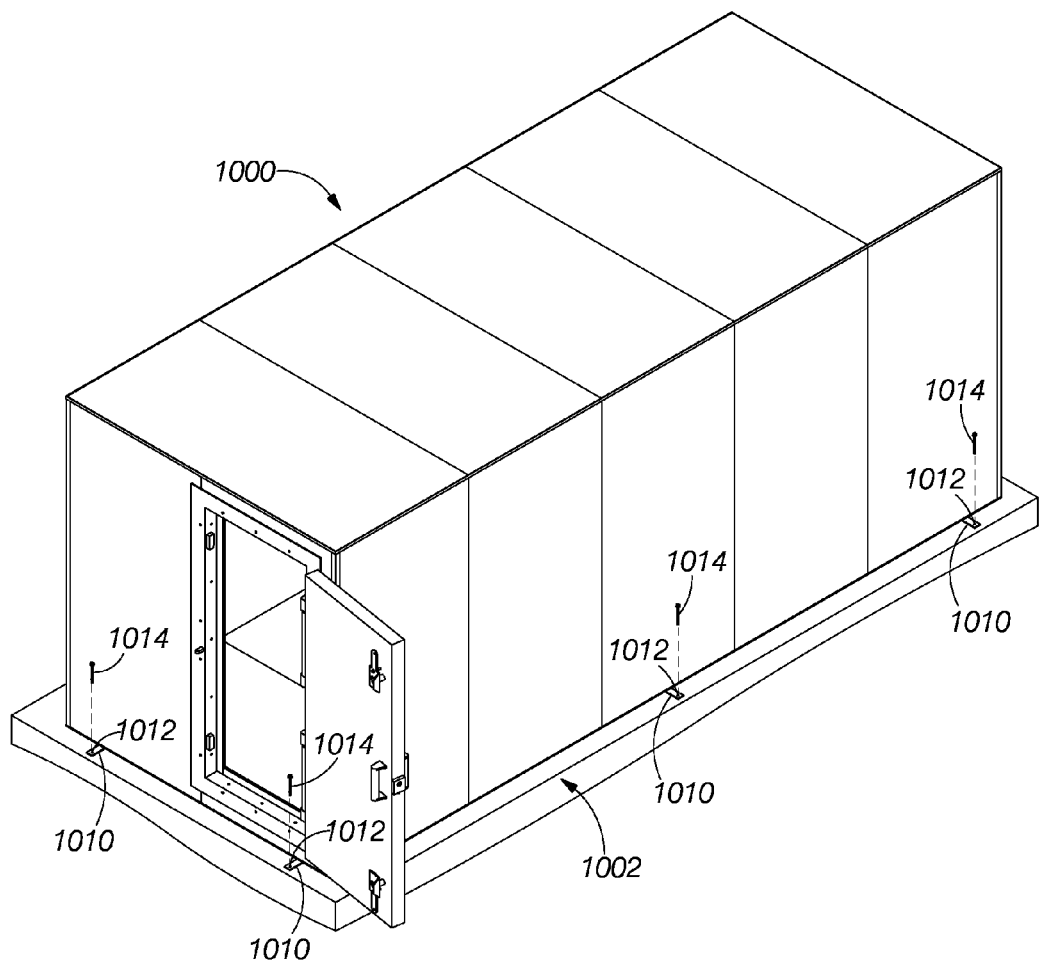
FIG. 26 illustrates an alternative system and method for securing a shelter to a poured concrete slab 1002.

FIG. 26 illustrates an alternative system and method for securing a shelter 1000 to a poured concrete slab 1002. The shelter 1000 in FIG. 26 corresponds to the shelter 100 of FIG. 1 except for the tie-down system shown in FIG. 26. Rather than pre-positioning the tie-down systems 300 of FIGS. 5 and 6 in the concrete as described above, in the system and method of FIG. 26, the concrete slab is constructed to have a larger area than the floor area of the shelter. The shelter includes a plurality of metal brackets 1010 that extend perpendicularly outward from the lower side plates 240 and the lower end plates 242. The metal brackets advantageously comprise steel having a thickness of approximately ¼ inch. The metal brackets are welded or otherwise secured to the respective side and end plates. Each metal bracket includes a respective mounting hole 1012 that receives a tie-down device 1014. In the illustrated embodiment, the tie-down device comprises a concrete anchor, such as, for example, a commercially available, heavy-duty wedge anchor. The structure and operation of such wedge anchors is well-known. Briefly, a hole of a diameter specified by the manufacture of the wedge anchor is drilled into the concrete slab to a sufficient depth. The wedge anchor is positioned through the hole in the bracket and then into the hole. Thereafter, a nut on an upper threaded portion of the wedge anchor is tightened to expand the lower portion of the wedge anchor within the concrete, which causes the wedge anchor to be secured firmly by the surrounding concrete. Suitable washers and other know devices secure the tops of the screws to the brackets to secure the shelter to the concrete slab. Alternatively, commercially available epoxy concrete anchors may be used. Briefly, a hole drilled into the concrete slab, as described above, is filled with a suitable volume of epoxy. A tie-down bolt is inserted through the hole in one of the brackets and into the unset epoxy. When the epoxy sets, the tie-down bolt is firmly secured to the concrete and is then secured to the bracket using nuts and washers, as described above.

Figure 27:
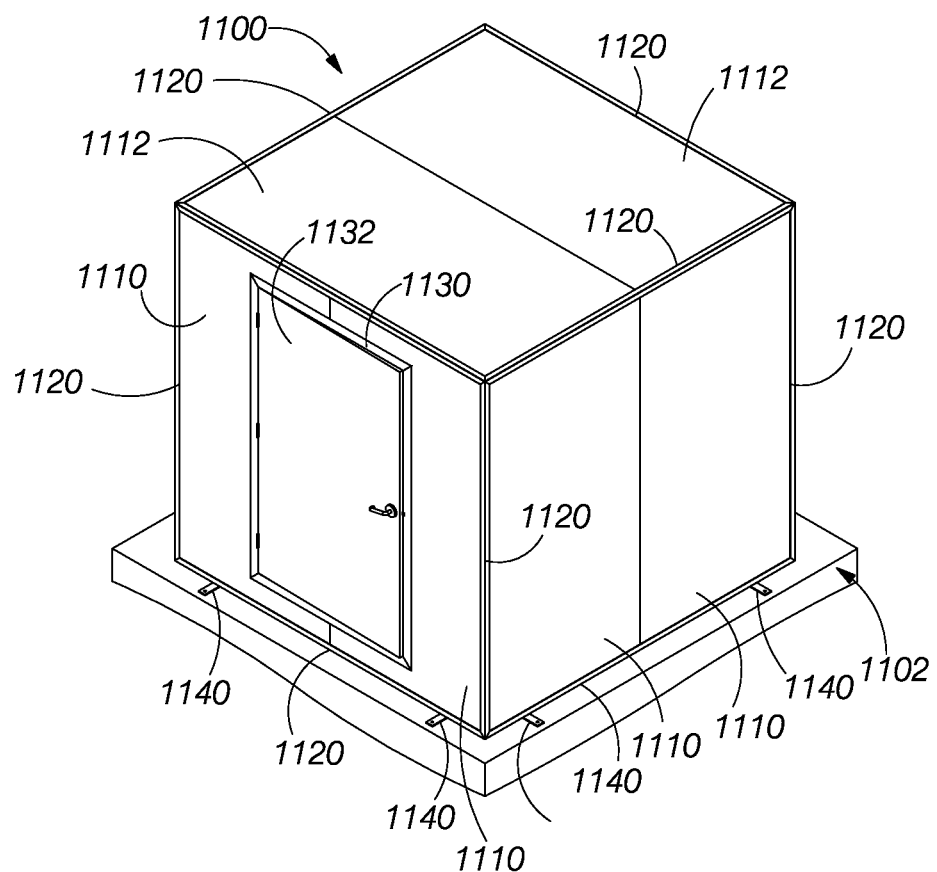
FIG. 27 illustrates an alternative embodiment of a shelter mounted on a concrete slab or other supporting foundation.
Figure 28:
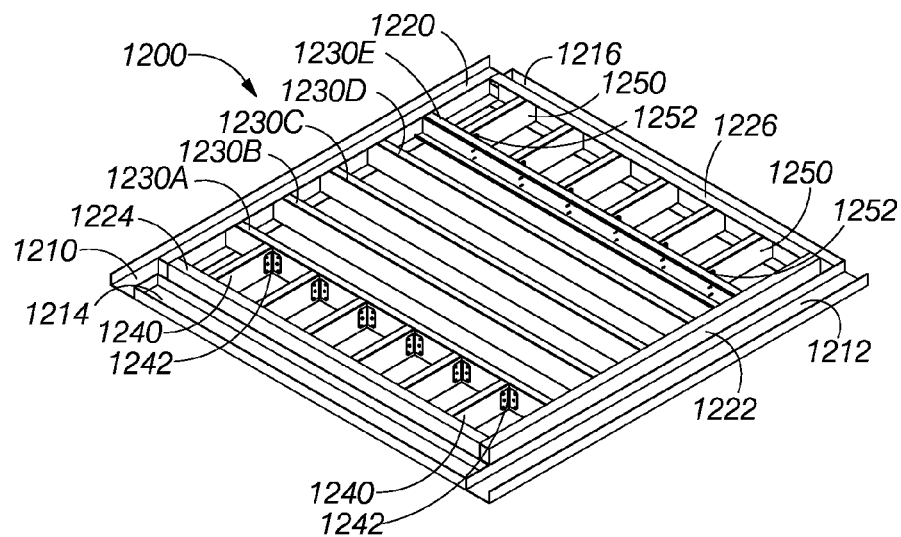
FIG. 28 illustrates an initial step of constructing a floor structure for the cube-shaped shelter of FIG. 27.
Figure 29:
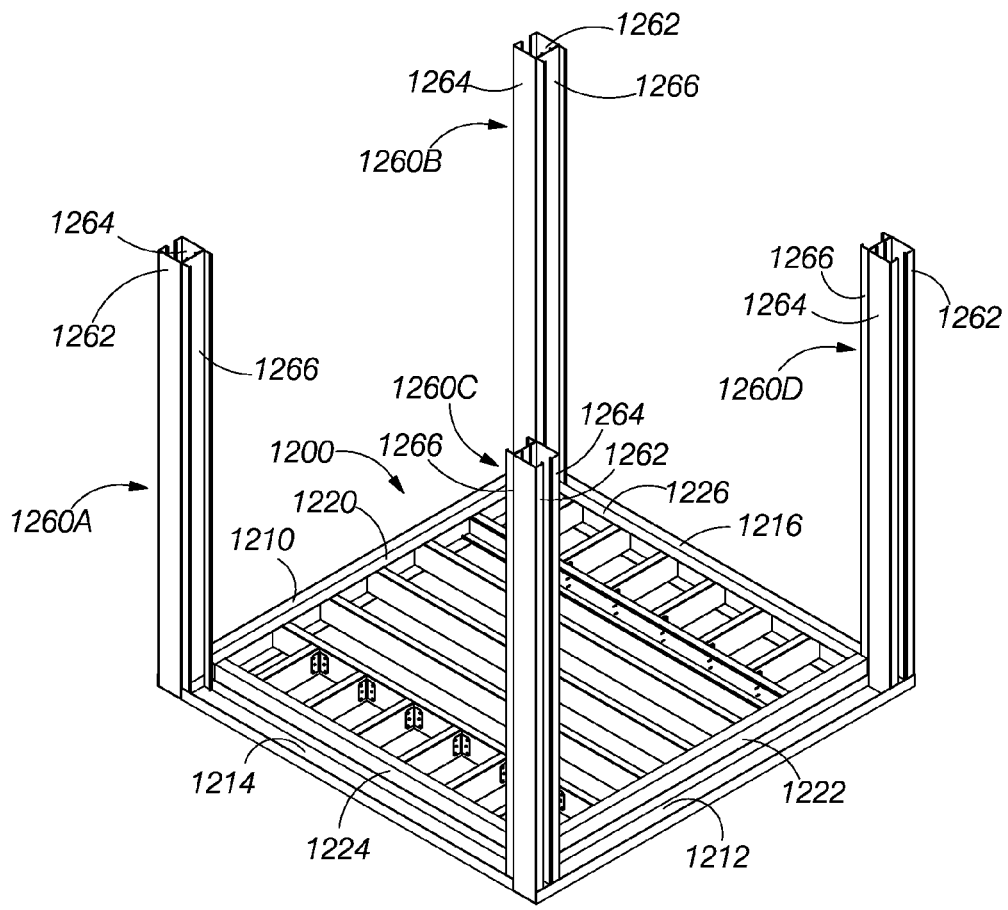
FIG. 29 illustrates the erection of a vertical column at each of the four corners of the floor structure of FIG. 28.
Figure 30:
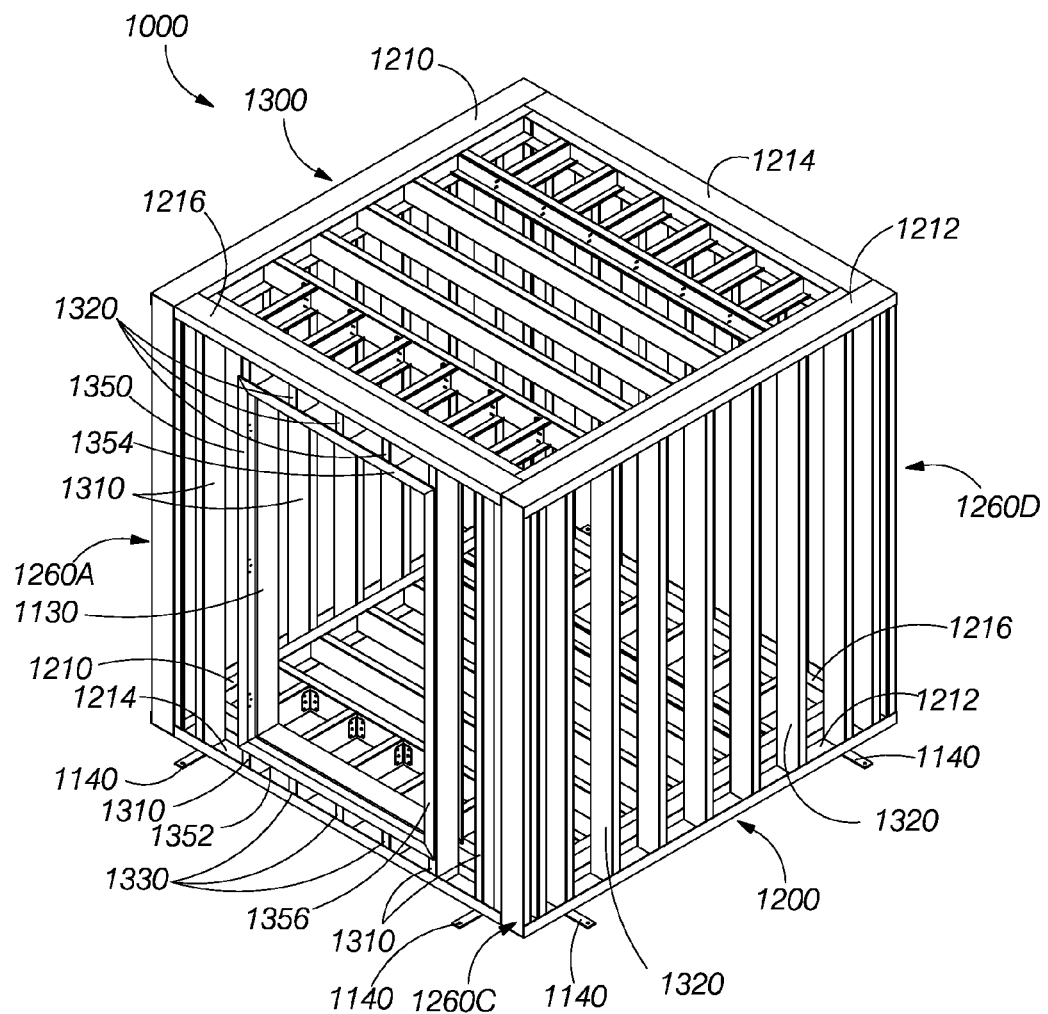
FIG. 30 illustrates the completion of the skeleton of the cube structure by adding a roof structure to the tops of the columns of FIG. 29, adding vertical studs between the columns, and adding a door frame in one wall of the structure.
Figure 31:
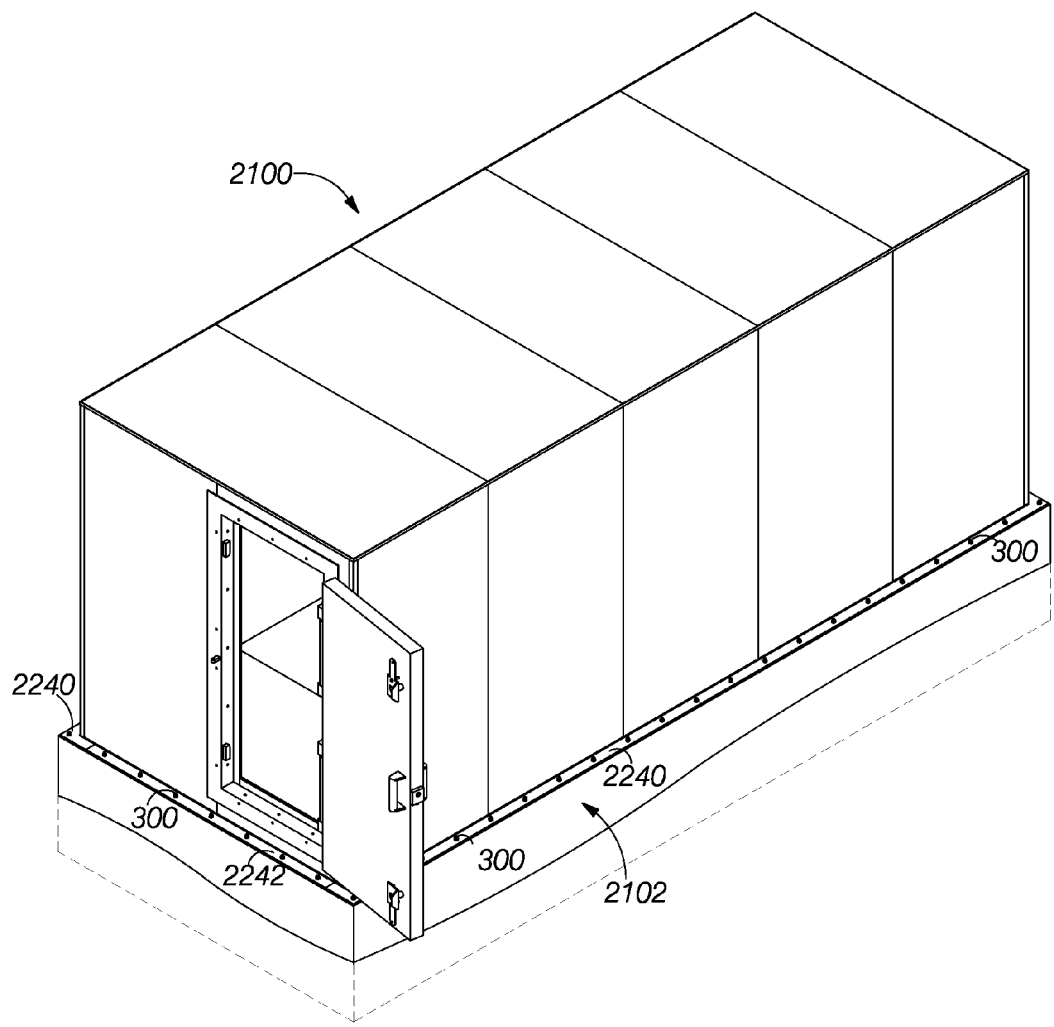
FIG. 31 illustrates an embodiment of the structure of FIGS. 1-26 that includes a modified system having an extended plate for securing the structure to the foundation.
Figure 32:
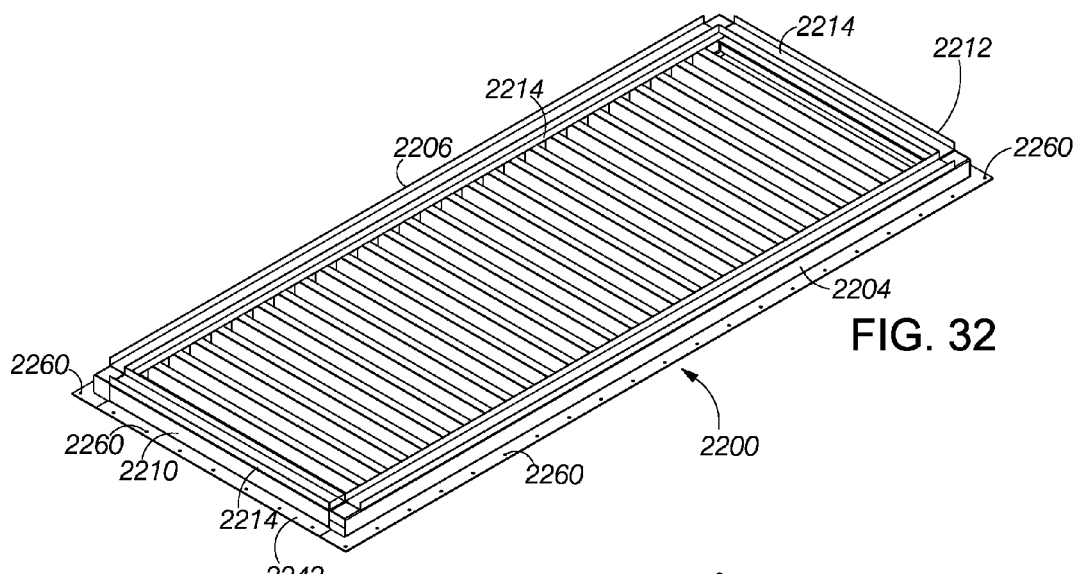
FIG. 32 illustrates a perspective view of the floor structure of the shelter of FIG. 31 viewed from above.
Figure 33:
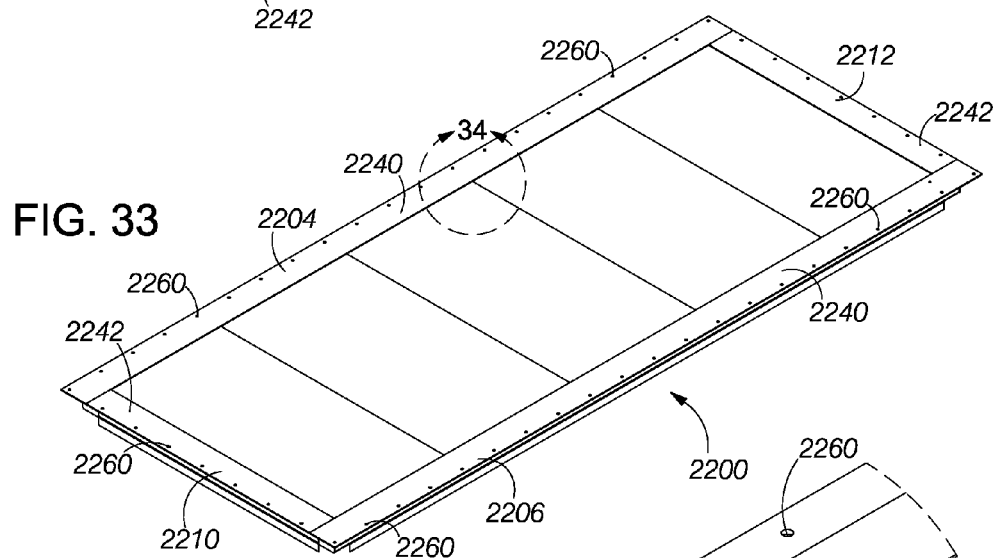
FIG. 33 illustrates a perspective view of floor structure of the shelter of FIG. 31 viewed from below.
Figure 34:
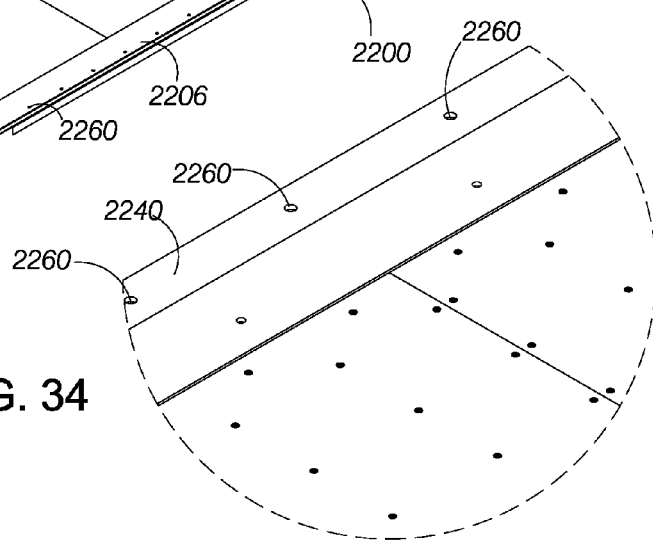
FIG. 34 illustrates an enlarged perspective view of a portion of the floor structure of FIG. 33 taken within the circular area -34- of FIG. 33 to show the through holes in the extended plate in more detail.
Figure 35:
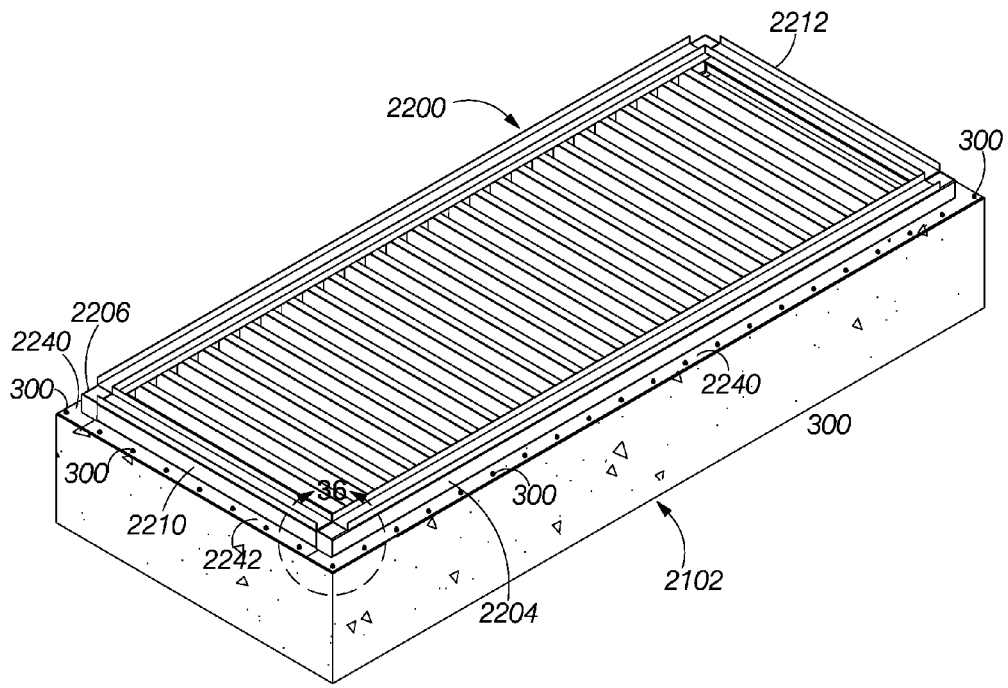
FIG. 35 illustrates an upper perspective view of the foundation prior to installation of the floor structure of FIGS. 32 and 33 and further showing the tie down structures embedded in the concrete and extending upward from the top of the foundation to engage the through holes in the extended plate.
Figure 36:
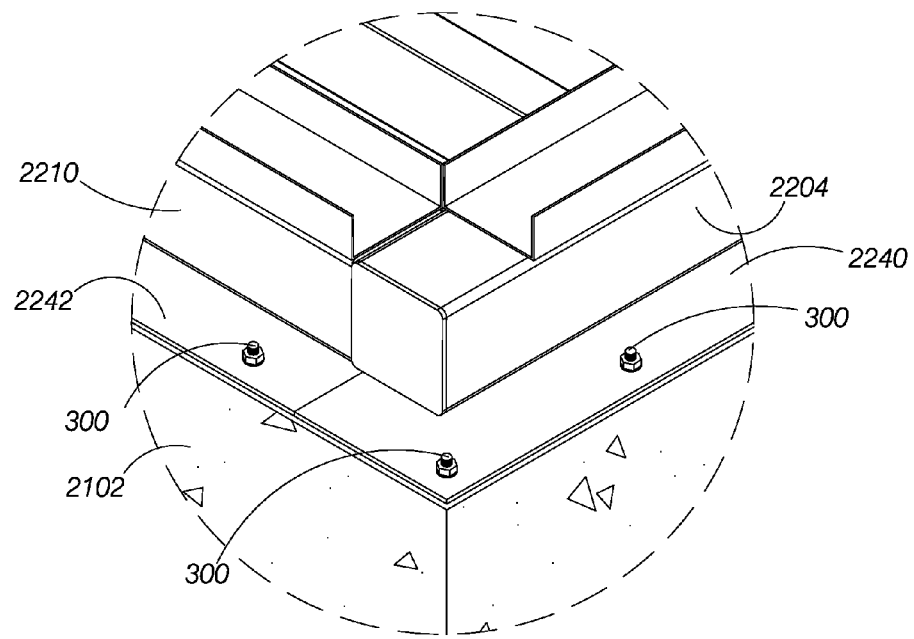
FIG. 36 illustrates an enlarged perspective view of the foundation of FIG. 35 taken within the circular area -36- of FIG. 35 showing the tie down structure and the extended plate in more detail.
Figure 38A:
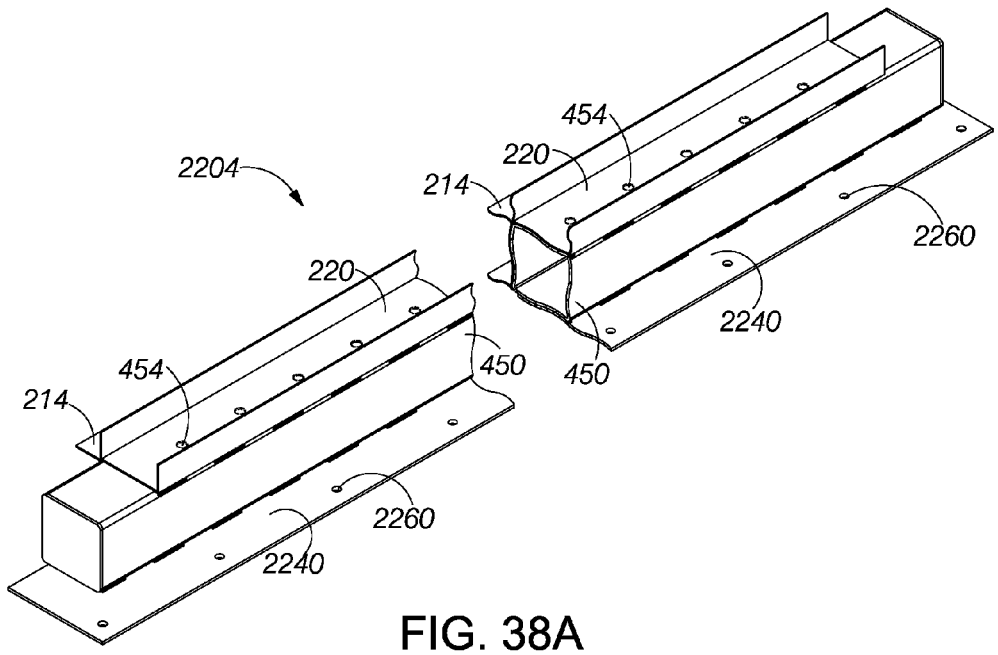
FIGS. 38A, 38B and 38C illustrate a perspective view, an elevational end view and a flipped perspective view, respectively, of one of the side beams of the floor structure of FIGS. 32 and 33, the perspective views of FIGS. 38A and 38B being partially broken way in order to fit the views within the figure margins.
Figure 38B:
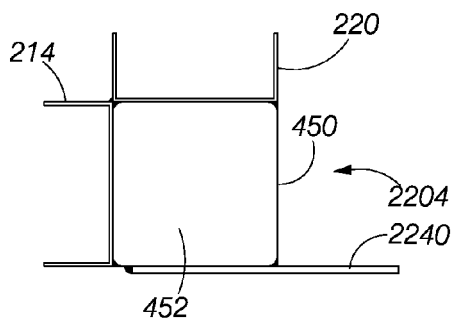
Figure 38C:
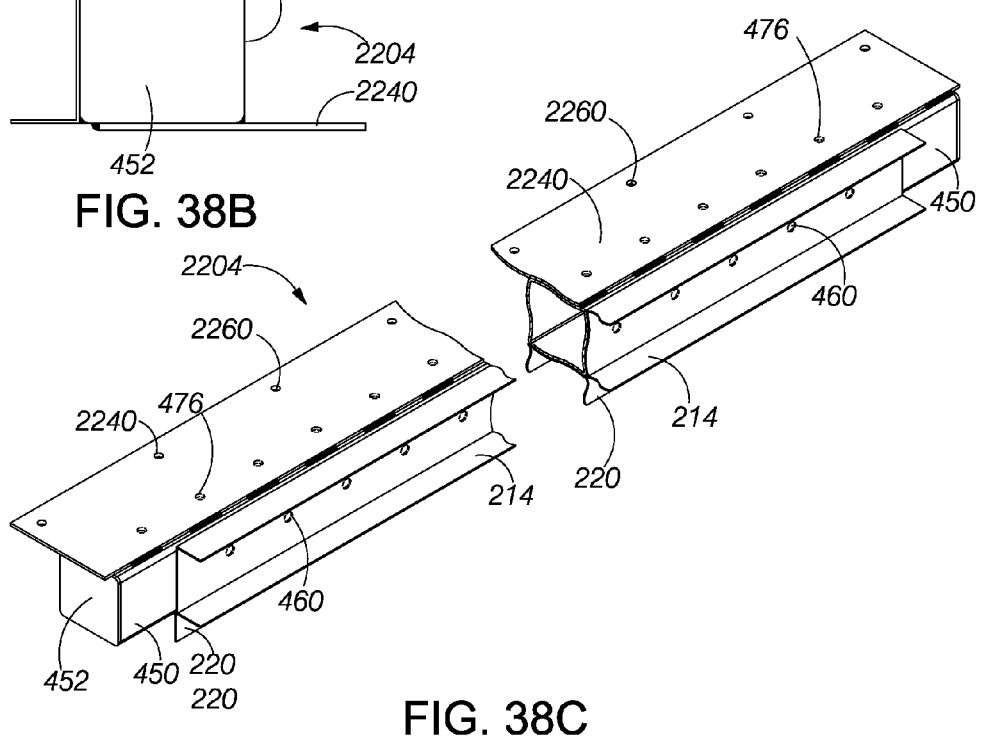

FIG. 27 illustrates an alternative embodiment of a shelter 1100 mounted on a concrete slab 1102 or other supporting foundation. As illustrated in FIGS. 28-30, the shelter of FIG. 27 is constructed using U-shaped mounting channels and C-studs without using the steel tubes used to assemble the shelter 100, described above.

FIG. 27 illustrates the completed shelter, which is generally cube shaped, and which has dimensions of approximately 8 feet by 8 feet by 8 feet in the disclosed embodiment. Shelters of different sizes and different configurations can be readily constructed by modifying the dimensions of the components of the shelter. The shelter in FIG. 27 comprises a plurality of outer side panels 1110 and outer roof panels 1112, which are advantageously constructed in the manner described above for the shelter 100. The shelter in FIG. 27 further comprises inner side panels, ceiling panels and upper floor panels (not shown) as described above for the first embodiment. The lower floor panels at the bottom of the shelter in FIG. 27 are advantageously constructed and attached in the manner of the outer roof panels. The edges of the cube-shaped shelter in FIG. 27 are protected by a corresponding edge (or corner) protector 1120. All edges may be protected as shown or selected edges may be protected. The shelter of FIG. 27 further includes a door frame 1130 and a door 1132 in one of the vertical faces of the cube. In the illustrated embodiment, the door frame and door comprise a commercially available pre-hung door and frame combination, which preferably are fire rated. In the illustrated embodiment, the shelter of FIG. 27 is mounted on the slab or other foundation using a plurality of hold-down brackets 1140, which are secured to the slab by anchor bolts (not shown) as described above in connection with the embodiment of FIG. 26.

FIG. 28 illustrates an initial step in constructing the cube-shaped shelter 1100 of FIG. 27. In particular, a floor support structure 1200 is first created using a plurality of U-channel mounting tracks that form a generally square-shaped outline of the bottom face of the cube. A first mounting track 1210 and a second mounting track 1212 are positioned parallel to each other with their respective webs forming a bottom surface and with their respective flanges directed upward. The first and second mounting tracks are positioned approximately 8 feet apart as measured from their respective outer flanges. The first and second mounting tracks have lengths of approximately 8 feet. As described above, each mounting track has a width across the two flanges of approximately 6 inches. A third mounting track 1214 and a fourth mounting track 1216 are positioned parallel to each other and perpendicular to the first and second mounting tracks, also with their respective webs forming a bottom surface and with their respective flanges directed upward. The third and fourth mounting tracks are positioned with their respective outer flanges approximately 8 feet apart. Each of the third and fourth mounting tracks has a length of approximately 7 feet so that the ends of the third and fourth mounting tracks abuts the inner flanges of the first and second mounting tracks. The ends of the third and fourth mounting tracks are secured to the inner flanges of the first and second mounting tracks by welding or other suitable technique. As a result of the positioning and securing, the first, second, third and fourth mounting tracks form a square-shaped outline of the floor of the cube-shaped shelter.

The floor support structure 1200 further includes a fifth mounting track 1220 and a sixth mounting track 1222, which are mounted with their respective flanges parallel to the bottom surface. The web of the fifth mounting track is secured to the inner flange of the first mounting track. The web of the sixth mounting track is secured to the inner flange of the second mounting track. The flanges of the fifth and sixth mounting tracks are directed inwardly. The fifth and sixth mounting tracks have lengths of approximately 7 feet such that the ends of the fifth and sixth mounting tracks abut the inner flanges of the third and fourth mounting tracks. A seventh mounting track 1224 and an eighth mounting track 1226 are positioned perpendicular to the fifth and sixth mounting tracks with the web of the seventh mounting track secured to the inner flange of the third mounting track and with the web of the eighth mounting track secured to the inner flange of the fourth mounting track. The lengths of the seventh and eighth mounting tracks are slightly less than 7 feet. The flanges of the seventh and eighth mounting tracks are directed inwardly.

A plurality (e.g., five) of horizontally disposed studs 1230A-E are positioned between the fifth mounting track 1220 and the sixth mounting track 1220. The studs have lengths that are slightly less than 7 feet. The center stud 1230C is mounted with a centerline defined by its flanges secured substantially at the midpoint of each of the fifth and sixth mounting tracks. Two of the remaining studs 1230A and 1230B are positioned on one side of the center stud with the centerline of the stud 1230B spaced approximately 6 inches apart from the centerline of the center stud and with the centerline of the stud 1230A spaced apart from the centerline of the stud 1230B. The other two remaining studs 1230D and 1230E are positioned on the opposite side of the center stud with the centerline of the stud 1230D spaced approximately 6 inches apart from the centerline of the center stud and with the centerline of the stud 1230E spaced apart from the centerline of the stud 1230D. A first plurality (e.g., six) of shortened horizontal studs 1240 are positioned between the web of the stud 1230A and the web of the seventh mounting track 1224. The shortened horizontal studs are spaced apart from each other by approximately 6 inches center-to-center. The shortened horizontal studs are secured to the seventh mounting track by a plurality of screws or other conventional fastening devices. Each shortened horizontal stud is secured to the web of the stud 1230A via a respective angle bracket 1242 and screws (not shown). Similarly, a second plurality (e.g., six) of shortened horizontal studs 1250 are positioned between the web of the stud 1230E and the eighth mounting track 1226 in like manner using a respective angle bracket 1252 to secure each shortened horizontal stud to the web of the eighth mounting track.

As illustrated in FIG. 29, a next step in constructing the cube-shaped shelter 1100 of FIG. 27 is to erect a vertical column 1260A-D at each of the four corners of the floor structure 1200. Each column comprises a first vertical stud 1262, a second vertical stud 1264 and a third vertical stud 1264. The first and second vertical studs of the first column 1260A are mounted with a respective lower end adjacent the web of the first mounting track 1210 at one end of the first mounting track. The first and second vertical studs are positioned with their respective flanges directed toward each other and with their webs approximately 6 inches apart so as to form an initial 6-inch by 6-inch column. The third vertical stud is mounted with its lower end adjacent the web of the third mounting and with its web adjacent the inner flanges of the first and second vertical studs. The web of the third vertical stud is secured to the flanges of the first and second vertical stud to form an overall column having dimensions of approximately 6 inches by 8.5 inches. The lower portions of the three studs forming the column are secured to the flanges of the mounting tracks by welding or by suitable fasteners. The other three vertical columns 1260B-D are formed in like manner at the other three corners of the floor structure.

After erecting the columns 1260A-D on the floor structure 1200, a roof structure 1300 is mounted on the exposed top ends of the columns as shown in FIG. 30. In the illustrated embodiment, the roof structure is substantially identical to the floor structure and is mounted in an inverted relationship to the floor structure so that the respective flanges of the first, second, third and fourth mounting tracks 1210, 1212, 1214, 1216, as identified in FIG. 28, face downward. The upper ends of the vertical studs of the columns are secured to the roof structure in the manner described above for securing the studs to the floor structure. A plurality of vertical studs 1310 are positioned between the first, second, third and fourth mounting tracks of the floor structure and the corresponding mounting tracks of the roof structure. As shown in FIG. 30, three of the sides of the cube comprise 7 studs between the columns at each edge of the respective side. Each stud has a length of slightly less than 8 feet. The studs are spaced apart by approximately 6 inches center-to-center except for the studs nearer the two columns. The two end studs are spaced apart from the columns by a distance such that the centers of the two end studs are approximately 6 inches from the respective edges of the cube.

As further shown in FIG. 30, the fourth side (the side facing down and to the left) comprises four full-length studs 1310 spaced apart from each other and spaced apart from the respective columns by the distances described above. The locations where the middle three studs are located on the other faces include three short upper vertical studs 1320 that extend downward from the fourth mounting track 1216 of the roof structure 1300 and three short lower vertical studs 1330 that extend upward from the third mounting track 1214 of the floor structure 1200. In the illustrated embodiment, the short upper vertical studs have lengths of approximately 8.7 inches and the short lower vertical studs have corresponding lengths. Accordingly, a gap of approximately 78 inches is formed between lower ends of the short upper vertical studs and the upper ends of the short lower vertical studs. The door frame 1130 is formed in the gap between the short upper and lower vertical studs. The door frame comprises a header 1350 secured to the lower ends of the short upper vertical studs, a footer 1352 secured to the upper ends of the short lower vertical studs, a first vertical frame member 1354 secured to a full-length vertical stud to the left of the gap and a second vertical frame member 1356 secured to the full-length vertical stud to the right of the gap. The header, footer and the two vertical frame members form a rectangular opening that receives the door 1132 as shown in FIG. 27.

As further illustrated in FIG. 30, the hold-down brackets 1140 may be attached to the mounting tracks 1210, 1212, 1214, 1216 of the floor structure by welding or by using suitable fasteners.

After completing the frame structure shown in FIG. 30, the inner and outer panels of the cube structure are installed to complete the structure shown in FIG. 27. In particular, inner wall panels are secured to the inner flanges of the vertical studs, ceiling panels are secured to the inner flanges of the horizontal studs of the roof structure 1300, and floor panels are secured to the inner (upper) flanges of the horizontal studs of the floor structure 1200. Roof panels are secured to the outer flanges of the horizontal studs of the of the roof structure, and outside wall panels are secured to the outer flanges of the vertical studs. In the illustrated embodiment, lower floor panels corresponding to the roof panels are secured to the outer (lower) flanges of the horizontal studs in the floor structure. The lower flange of the horizontal studs in the floor may be covered with a metallic diaphragm as described for the first embodiment; however, using a common panel configuration reduces the types of materials required at a construction site. The metal sheets in the lower floor panels function like the diaphragm of the first embodiment. The panels may be secured to the frame structure when the frame structure is first manufactured or may be secured to the frame structure after the frame structure is delivered to an installation site. The cube structure may further include the flexible bags between adjacent horizontal studs and between adjacent vertical studs as illustrated above in FIGS. 24 and 25.

The shelters described herein provide protection against high winds, such as winds from tornadoes, hurricanes and the like, and from high pressures caused by blasts and the like. The shelters further provide protection from ballistic objects that are driven by such winds and such blasts. The shelters are easily assembled at a selected site with precut materials which are readily interconnected using basic welding techniques. For example, the various beams, columns, joists and studs may be pre-assembled within a factory using mass production techniques and delivered to the site as a construction kit to be installed on the foundation 102, which is configured to receive the elements of the floor structure 200, as described above. After interconnecting the beams 204, 206, 210, 212 of the floor structure, the columns 510, and the beams 560, 562, 564, 566 of the roof structure 550 using conventional welding techniques, the remaining studs, panels and door are easily installed using self-tapping screws as described above. Alternatively, the shelters may be delivered on-site in a substantially completed condition and lowered onto a suitable foundation and attached in accordance with one of the methods disclosed herein or in accordance with another suitable method.

Figure 8:
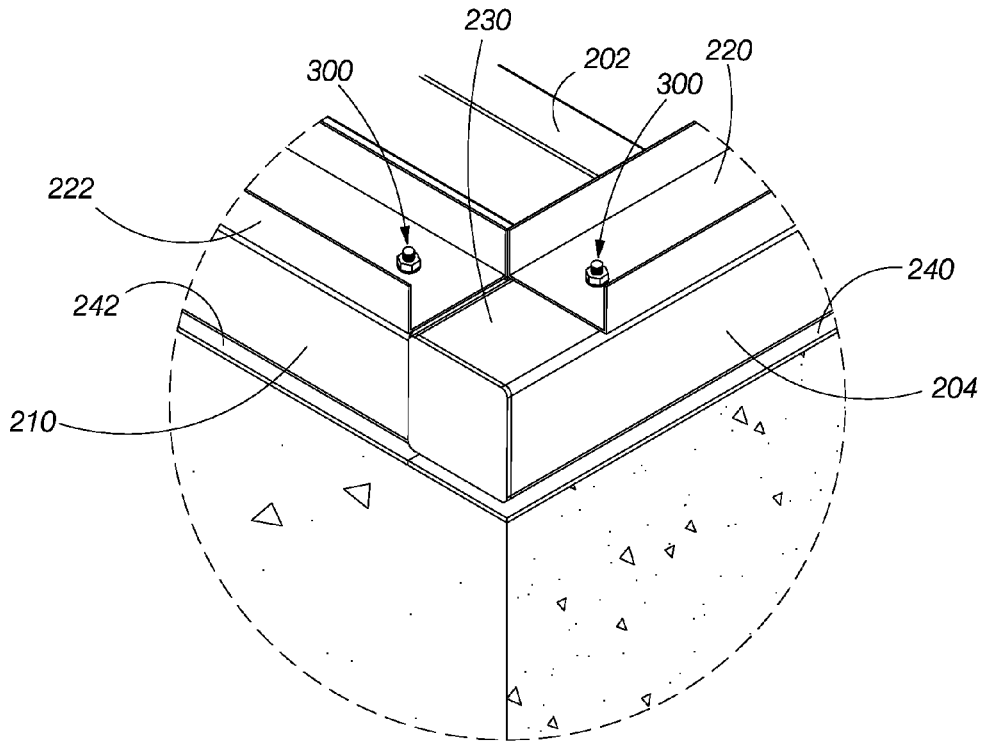
FIG. 8 illustrates an enlarged perspective view of the floor structure and the foundation of FIG. 7 taken within the circular area -8- of FIG. 7 to show the tie down structures that secure the floor structure to the foundation in more detail.

In the embodiments illustrated above, the structures are secured to the foundation by bolts extending through the beams as shown in FIGS. 7 and 8, or by bolts secured to metal brackets as shown in FIGS. 26, 27 and 30. FIGS. 31-41 illustrate additional embodiments to show a further system and method for securing the structures to the foundation.

As shown in FIGS. 31-36, a structure 2100 is secured to a foundation 2102 via a floor assembly 2200. The floor assembly includes a pair of lower side plates 2240 (FIG. 33), which are secured to lower side beams 2204, 2206, and a pair of lower end plates 2242, which are secured to lower end beams 2210, 2212. The lower plates of FIGS. 31-36 are wider than the corresponding lower plates 240, 242 of the structure 100 described above. In particular, the lower plates extend a sufficient distance beyond the outer walls of the structure (e.g., approximately 2-4 inches) so that a plurality of holes 2260 in the lower plates are exposed and are positioned over the foundation. The holes engage respective tie-down systems, such as, for example, the tie-down system 300 illustrated in FIG. 6. Alternatively, the bores may engage a tie-down device such as the heavy-duty wedge anchor 1014 illustrated in FIG. 26. The embodiment of FIGS. 31-36 is easier to secure to the foundation because the engagement holes are exposed as the structure as lowered onto the foundation.

Other than the widths of the lower plates 2240, 2242 and the positioning of the holes 2260, the structure 2100 is constructed in a similar manner to the structure 100. For example, FIGS. 37A-E correspond to FIGS. 9A-E and illustrate the structure of the end beam 2210, wherein like elements are numbered as before. As shown in FIGS. 37A-E, the lower plate 2242 extends a sufficient distance from the side of the beam 400 to provide space for the holes 2260. For example, the plate extends approximately 2-4 inches from the side of the beam. Similarly, FIGS. 38A-E correspond to FIGS. 10A-E and illustrate the structure of the side beam 2204, wherein like elements are numbered as before.

Figure 39:
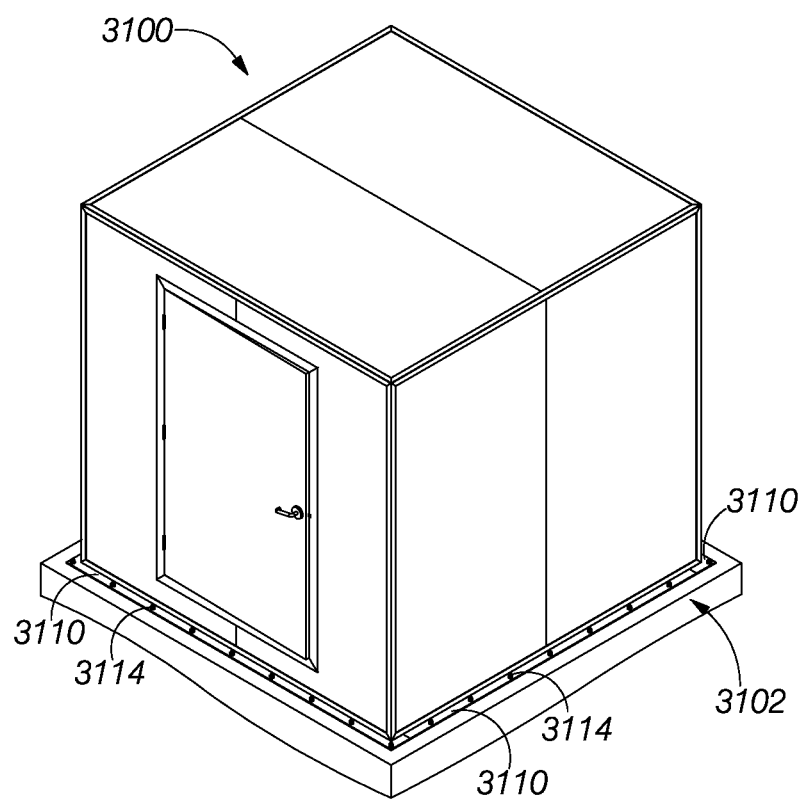
FIG. 39 illustrates a cube-shaped shelter similar to the shelter illustrated in FIG. 27, which incorporates the modified system for securing the shelter to the foundation.
Figure 40:
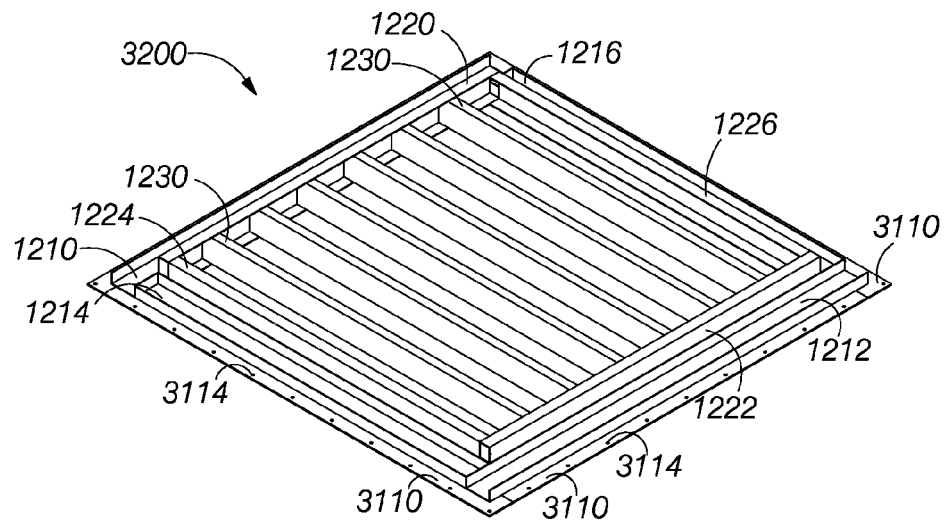
FIG. 40 illustrates an initial step of constructing a floor structure for the cube-shaped shelter of FIG. 39, the floor structure further including horizontal floor joists of the same length.
Figure 41:
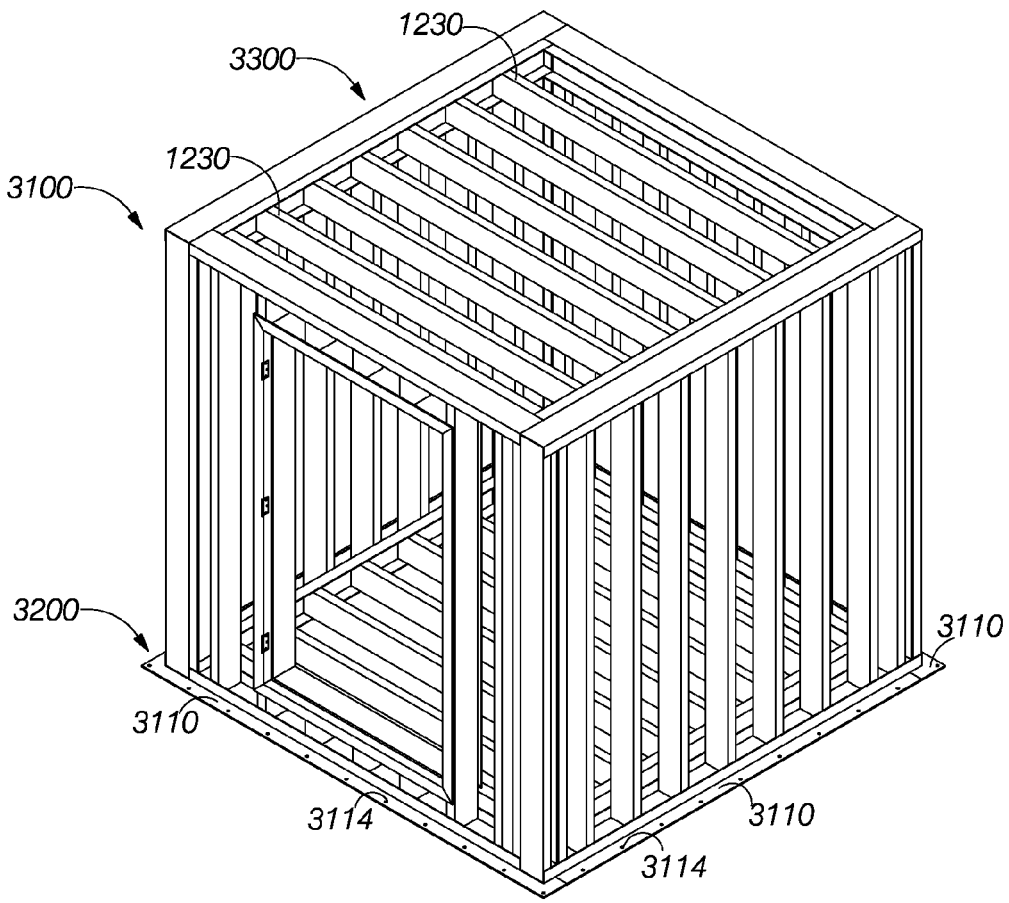
FIG. 41 illustrates the completion of the skeleton of the cube structure by adding columns and a roof structure to the floor structure of FIG. 40, adding vertical studs between the columns, and adding a door frame in one wall of the structure.

FIGS. 39-41 illustrate an alternative embodiment of a cube-shaped shelter 3100 similar to the cube-shaped shelter 1100 of FIGS. 27-30. The cube-shaped shelter is mounted on a foundation 3102. The cube-shaped shelter of FIGS. 39-41 is modified to include a plurality of floor plates 3110 secured to the bottom of a floor assembly 3200 of the shelter. The floor plates extend outward from the bottom of the floor assembly and includes a plurality of holes 3112 (FIGS. 40 and 41) that receive a corresponding plurality of tie-down systems 3114, as described above with respect to the other embodiments. As further shown in FIGS. 39-41, the floor assembly 3200 and a roof assembly 3300 differ from the floor assembly 1200 and roof assembly 1300 of the embodiment of FIGS. 27-30 by replacing the shortened horizontal studs 1240 with additional full-length horizontal studs 1230.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A shelter for protecting occupants from debris and other effects of high velocity winds and explosive blasts, the shelter comprising:
   a first generally rectangular steel frame structure comprising a first lower side hollow structural section (HSS) steel tube beam, a second lower side HSS steel tube beam, a first lower end HSS steel tube beam and a second lower end HSS steel tube beam, the first and second lower end HSS steel tube beams positioned perpendicularly to the first and second lower side HSS steel tube beams and secured to the lower side HSS steel tube beams, the intersections of the lower end HSS steel tube beams with the lower side HSS steel tube beams forming corners of the first steel frame structure;
   a plurality of floor joists extending between the lower side HSS steel tube beams, each joist having an upper surface and a lower surface; and
   a floor comprising a plurality of floor panels secured to the upper surfaces of the floor joists, each floor panel comprising a non-combustible board laminated to a metallic sheet, each floor panel positioned on the floor joists with the respective metallic sheet adjacent to upper surfaces of the floor joists and with the non-combustible board facing upward away from the floor joists;
   a plurality of vertical columns, each column having a lower end and an upper end, at least one column of the plurality of columns positioned at each corner of the first steel frame structure with the lower end of the column secured to the first steel frame structure;
   a roof structure, comprising:
      a second generally rectangular steel frame structure comprising a first upper side HSS steel tube beam, a second upper side HSS steel tube beam, a first upper end HSS steel tube beam and a second upper end HSS steel tube beam, the first and second upper end HSS steel tube beams positioned perpendicularly to the first and second upper side HSS steel tube beams, the intersections of the upper end HSS steel tube beams with the upper side HSS steel tube beams forming corners of the second steel frame structure, the corners of the second steel frame structure positioned onto the upper ends of the columns and secured to the upper ends of the columns;
      a plurality of roof joists extending between the first and second upper side HSS steel tube beams, each roof joist having an upper surface and a lower surface;
      a roof comprising a plurality of roof panels secured to the upper surfaces of the roof joists, each roof panel comprising a non-combustible board laminated to a metallic sheet, each roof panel positioned on the roof joists with the respective metallic sheet adjacent to upper surfaces of the roof joists and with the non-combustible board facing upward away from the roof joists;
   and
   a first side wall formed between the first lower side HSS steel tube beam and the first upper side HSS steel tube beam, a second side wall formed between the second lower side HSS steel tube beam and the second upper side HSS steel tube beam, a first end wall formed between the first lower end HSS steel tube beam and the first upper end HSS steel tube beam, and a second end wall formed between the second lower end HSS steel tube beam and the second upper end HSS steel tube beam, each of the first and second side walls and the first and second end walls comprising:
      a respective plurality of wall studs extending vertically from the respective lower HSS steel tube beam to the respective upper HSS steel tube beam, each wall stud having an inner surface and an outer surface; and
      a respective plurality of outer wall panels positioned on the outer surfaces of the respective wall studs, each outer wall panel comprising a non-combustible board laminated to a metallic sheet, each outer wall panel positioned on the wall studs with the respective metallic sheet adjacent to outer surfaces of the wall studs and with the non-combustible board facing outward away from the wall studs,
   wherein:
      each lower end HSS steel tube beam comprises:
         a hollow structural section steel tube having a lower surface and an upper surface; and
         a lower stud mounting track secured to the upper surface of the steel tube;

and each upper end HSS steel tube beam comprises:
- a hollow structural section steel tube having a lower surface and an upper surface;
- an upper stud mounting track secured to the lower surface of the steel tube; and
- a roof panel support frame secured to the upper surface of the steel tube.

2. The shelter of claim 1, wherein the floor structure is secured to a concrete foundation via a plurality of anchors embedded in the foundation.

3. The shelter of claim 1, wherein an opening is formed in at least one of the first end wall, the second end wall, the first side wall or the second side wall, and wherein a door is secured within the opening.

4. The shelter of claim 3, wherein the door is a blast resistant door.

5. The shelter of claim 1, where in the floor structure further includes a lower diaphragm comprising a plurality of metallic sheets secured to the lower surfaces of the floor joists.

6. The shelter of claim 1, wherein each of the first and second side walls and the first and second end walls further comprises a respective plurality of inner wall panels attached to the inner surfaces of the respective plurality of wall studs, each of the inner wall panels comprising a non-combustible board laminated to a metallic sheet, each inner wall panel positioned on the wall studs with the respective metallic sheet adjacent to inner surfaces of the wall studs and with the non-combustible board facing away from the wall studs.

7. The shelter of claim 6, wherein a plurality of cavities are formed in each of the first and second side walls and the first and second end walls, each cavity defined between a respective lower beam and a respective upper beam, between respective adjacent spaced apart studs and between the metallic sheets of respective outer and inner panels attached to the spaced apart studs, each cavity being at least partially filled with a material to impede the passage of a ballistic object that penetrates the outer panel.

8. The shelter of claim 7, wherein each cavity includes a flexible bag that is positioned in the cavity and filled with the material.

9. The shelter of claim 7, wherein the material comprises a granular material.

10. The shelter of claim 9, wherein the granular material is sand.

11. The shelter of claim 1, wherein the roof structure further comprises a plurality of ceiling panels secured to the lower surfaces of the roof joists, each ceiling panel comprising a non-combustible board laminated to a metallic sheet, each ceiling panel positioned on the roof joists with the respective metallic sheet adjacent to lower surfaces of the roof joists and with the non-combustible board facing downward away from the roof joists.

12. A shelter for protecting occupants from debris and other effects of high velocity winds and explosive blasts, the shelter comprising:
- a first generally rectangular steel frame structure comprising a first lower side hollow structural section (HSS) steel tube beam, a second lower side HSS steel tube beam, a first lower end HSS steel tube beam and a second lower end HSS steel tube beam, the first and second lower end HSS steel tube beams positioned perpendicularly to the first and second lower side HSS steel tube beams and secured to the lower side HSS steel tube beams, the intersections of the lower end HSS steel tube beams with the lower side HSS steel tube beams forming corners of the first steel frame structure;
- a plurality of floor joists extending between the lower side HSS steel tube beams, each joist having an upper surface and a lower surface; and
- a floor comprising a plurality of floor panels secured to the upper surfaces of the floor joists, each floor panel comprising a non-combustible board laminated to a metallic sheet, each floor panel positioned on the floor joists with the respective metallic sheet adjacent to upper surfaces of the floor joists and with the non-combustible board facing upward away from the floor joists;
- a plurality of vertical columns, each column having a lower end and an upper end, at least one column of the plurality of columns positioned at each corner of the first steel frame structure with the lower end of the column secured to the first steel frame structure;
- a roof structure, comprising:
  - a second generally rectangular steel frame structure comprising a first upper side HSS steel tube beam, a second upper side HSS steel tube beam, a first upper end HSS steel tube beam and a second upper end HSS steel tube beam, the first and second upper end HSS steel tube beams positioned perpendicularly to the first and second upper side HSS steel tube beams, the intersections of the upper end HSS steel tube beams with the upper side HSS steel tube beams forming corners of the second steel frame structure, the corners of the second steel frame structure positioned onto the upper ends of the columns and secured to the upper ends of the columns;
  - a plurality of roof joists extending between the first and second upper side HSS steel tube beams, each roof joist having an upper surface and a lower surface;
  - a roof comprising a plurality of roof panels secured to the upper surfaces of the roof joists, each roof panel comprising a non-combustible board laminated to a metallic sheet, each roof panel positioned on the roof joists with the respective metallic sheet adjacent to upper surfaces of the roof joists and with the non-combustible board facing upward away from the roof joists;

and
- a first side wall formed between the first lower side HSS steel tube beam and the first upper side HSS steel tube beam, a second side wall formed between the second lower side HSS steel tube beam and the second upper side HSS steel tube beam, a first end wall formed between the first lower end HSS steel tube beam and the first upper end HSS steel tube beam, and a second end wall formed between the second lower end HSS steel tube beam and the second upper end HSS steel tube beam, each of the first and second side walls and the first and second end walls comprising:
  - a respective plurality of wall studs extending vertically from the respective lower HSS steel tube beam to the respective upper HSS steel tube beam, each wall stud having an inner surface and an outer surface; and
  - a respective plurality of outer wall panels positioned on the outer surfaces of the respective wall studs, each outer wall panel comprising a non-combustible board laminated to a metallic sheet, each outer wall panel positioned on the wall studs with the respective metallic sheet adjacent to outer surfaces of the wall studs and with the non-combustible board facing outward away from the wall studs, wherein:
: each lower side HSS steel tube beam comprises:
:: a hollow structural section steel tube having a lower surface, an upper surface and a side surface;
:: a lower stud mounting track secured to the upper surface of the steel tube; and
:: a floor joist mounting track secured to the side surface of the steel tube;
: and
: each upper side HSS steel tube beam comprises:
:: a hollow structural section steel tube having a lower surface, an upper surface and a side surface;
:: an upper stud mounting track secured to the lower surface of the steel tube;
:: a roof joist mounting track secured to the side surface of the steel tube; and
:: a roof panel support frame secured to the upper surface of the steel tube.

13. The shelter of claim 12, wherein the floor structure is secured to a concrete foundation via a plurality of anchors embedded in the foundation.

14. The shelter of claim 12, wherein an opening is formed in at least one of the first end wall, the second end wall, the first side wall or the second side wall, and wherein a door is secured within the opening.

15. The shelter of claim 14, wherein the door is a blast resistant door.

16. The shelter of claim 12, where in the floor structure further includes a lower diaphragm comprising a plurality of metallic sheets secured to the lower surfaces of the floor joists.

17. The shelter of claim 12, wherein each of the first and second side walls and the first and second end walls further comprises a respective plurality of inner wall panels attached to the inner surfaces of the respective plurality of wall studs, each of the inner wall panels comprising a non-combustible board laminated to a metallic sheet, each inner wall panel positioned on the wall studs with the respective metallic sheet adjacent to inner surfaces of the wall studs and with the non-combustible board facing away from the wall studs.

18. The shelter of claim 17, wherein a plurality of cavities are formed in each of the first and second side walls and the first and second end walls, each cavity defined between a respective lower beam and a respective upper beam, between respective adjacent spaced apart studs and between the metallic sheets of respective outer and inner panels attached to the spaced apart studs, each cavity being at least partially filled with a material to impede the passage of a ballistic object that penetrates the outer panel.

19. The shelter of claim 18, wherein each cavity includes a flexible bag that is positioned in the cavity and filled with the material.

20. The shelter of claim 18, wherein the material comprises a granular material.

21. The shelter of claim 20, wherein the granular material is sand.

22. The shelter of claim 12, wherein the roof structure further comprises a plurality of ceiling panels secured to the lower surfaces of the roof joists, each ceiling panel comprising a non-combustible board laminated to a metallic sheet, each ceiling panel positioned on the roof joists with the respective metallic sheet adjacent to lower surfaces of the roof joists and with the non-combustible board facing downward away from the roof joists.

* * * * *